United States Patent
Park et al.

(10) Patent No.: US 7,659,944 B2
(45) Date of Patent: *Feb. 9, 2010

(54) DIGITAL VIDEO SIGNAL PROCESSING APPARATUS AND METHOD FOR FIELD-BASED ADAPTIVE SPATIO-TEMPORAL Y/C SEPARATION

(75) Inventors: Sung-cheol Park, Seoul (KR);
Hyung-jun Lim, Suwon-si (KR);
Jae-hong Park, Seongnam-si (KR);
Kyoung-mook Lim, Hwaseong-si (KR);
Heo-jin Byeon, Hwaseong-si (KR);
Dong-suk Shin, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 775 days.

This patent is subject to a terminal disclaimer.

(21) Appl. No.: 11/331,360

(22) Filed: Jan. 13, 2006

(65) Prior Publication Data
US 2006/0181648 A1 Aug. 17, 2006

(30) Foreign Application Priority Data
Jan. 13, 2005 (KR) ............... 10-2005-0003178

(51) Int. Cl.
*H04N 9/77* (2006.01)
(52) U.S. Cl. .............. 348/663; 348/665; 348/667; 348/669; 348/670
(58) Field of Classification Search ......... 348/663, 348/665, 667, 669, 670
See application file for complete search history.

(56) References Cited
U.S. PATENT DOCUMENTS 5,473,389 A * 12/1995 Eto et al. ............ 348/669
5,502,509 A * 3/1996 Kurashita et al. ......... 348/669
5,541,669 A * 7/1996 Yamaguchi et al. ....... 348/669
5,585,861 A * 12/1996 Taniguchi et al. ........ 348/669
5,686,972 A * 11/1997 Kim ..................... 348/663
5,909,255 A * 6/1999 Hatano .................. 348/663
5,990,978 A * 11/1999 Kim et al. .............. 348/663
6,055,024 A * 4/2000 DiMeo et al. ........... 348/668
6,288,754 B1 * 9/2001 Ito ...................... 348/663
6,300,985 B1 * 10/2001 Lowe et al. ............. 348/665
6,504,579 B1    1/2003 Scherrer
6,674,488 B1 * 1/2004 Satoh ................... 348/663
6,693,676 B2   2/2004 Yamaguchi et al.
6,774,954 B1 * 8/2004 Lee ..................... 348/665
6,795,126 B1 * 9/2004 Lee ..................... 348/663
6,809,778 B2 * 10/2004 Shibutani et al. ........ 348/667
6,914,638 B2 * 7/2005 Tsui .................... 348/663
6,956,620 B2 * 10/2005 Na ...................... 348/663

(Continued)

FOREIGN PATENT DOCUMENTS

JP    08-018997    1/1996

(Continued)

*Primary Examiner*—Brian P Yenke
(74) *Attorney, Agent, or Firm*—Lee & Morse, P.C.

(57) ABSTRACT

A digital video signal processing apparatus and method for field-based adaptive Y/C separation includes an adaptive 3D BPF performing Y/C separation according to local comb filtering/1D band pass filtering when the edge direction is fixed vertically/horizontally in response to spatio-temporal local characteristics of an image using spatio-temporal filters. When the edge direction is not fixed horizontally or vertically, the 3D BPF performs 2D/3D band pass filtering in all directions. The 3D BPF adaptively and continuously carries out comb filtering, 1D band pass filtering and 2D/3D band pass filtering in response to the spatio-temporal local characteristics of the image.

24 Claims, 17 Drawing Sheets

U.S. PATENT DOCUMENTS

| | | | |
|---|---|---|---|
| 7,046,306 B2 * | 5/2006 | Zhai et al. | 348/666 |
| 7,133,080 B2 * | 11/2006 | Kobayashi et al. | 348/663 |
| 7,176,984 B2 * | 2/2007 | Wu | 348/663 |
| 7,196,736 B2 * | 3/2007 | Ogawa | 348/670 |
| 7,227,587 B2 * | 6/2007 | MacInnis et al. | 348/667 |
| 7,274,408 B2 * | 9/2007 | Shan et al. | 348/669 |
| 7,304,688 B1 * | 12/2007 | Woodall | 348/663 |
| 7,324,163 B2 * | 1/2008 | Bacche | 348/663 |
| 7,420,624 B2 * | 9/2008 | Lin et al. | 348/663 |
| 7,453,525 B2 * | 11/2008 | Renner et al. | 348/702 |
| 2004/0174464 A1 * | 9/2004 | MacInnis et al. | 348/667 |
| 2004/0201781 A1 * | 10/2004 | Kobayashi et al. | 348/663 |
| 2006/0077302 A1 * | 4/2006 | Nieuwenhuizen | 348/665 |
| 2006/0176406 A1 | 8/2006 | Park et al. | |
| 2007/0153127 A1 * | 7/2007 | MacInnis et al. | 348/667 |

FOREIGN PATENT DOCUMENTS

| | | |
|---|---|---|
| JP | 2001-204045 | 7/2001 |
| KR | 1997-0068684 | 10/1997 |
| TW | 2006-33550 A | 9/2006 |

\* cited by examiner

FIG. 4

| +u | +v | −u | −v | +u |
|----|----|----|----|----|
| −u | −v | +u | +v | −u |
| +u | +v | −u | −v | +u |

FIG. 5

| +u | −v | −u | +v | +u |
|----|----|----|----|----|
| +v | −u | −v | +u | +v |
| −u | +v | +u | −v | −u |
| −v | +u | +v | −u | −v |
| +u | −v | −u | +v | +u |

DIGITAL VIDEO SIGNAL PROCESSING APPARATUS AND METHOD FOR FIELD-BASED ADAPTIVE SPATIO-TEMPORAL Y/C SEPARATION

BACKGROUND OF THE INVENTION

1. Field of the Invention

The present invention relates to a digital video signal processing apparatus. More particularly, the present invention relates to a digital video signal processing apparatus and method for field-based adaptive spatio-temporal, i.e., 3-dimensional (3D), Y/C separation in NTSC/PAL (National Television System Committee/Phase Alternation by Line) systems.

2. Description of the Related Art

The display of an NTSC/PAL broadcasting system includes a device for processing a CVBS (Composite Video Blanking Sync) signal, which is a composite of a Y (luminance) signal and a C (chrominance) signal. The C signal is quadrature-amplitude-modulated with a subcarrier frequency fsc. Thus, characteristics of the C signal are determined by its frequency and phase. A digital video signal processing apparatus at a receiving stage separates Y and C signals with reference to the characteristic of the C signal and displays an image based on the separated signals.

FIG. 1 illustrates a block diagram of a conventional video signal processing apparatus 100. Referring to FIG. 1, the video signal processing apparatus 100 includes a comb filter 110, a one-dimensional bandpass filter (1D-BPF) 120, a weight determination unit 130, a combiner 140 and a subtracter 150. The comb filter 110 one-dimensionally band-pass-filters an input video signal in the vertical direction. The 1D-BPF 120 one-dimensionally band-pass-filters the input video signal in the horizontal direction. The weight determination unit 130 determines weights of the output of the comb filter 110 and the output of the 1D-BPF 120 with reference to vertical/horizontal correlation and the phase of a C signal. The combiner 140 combines the output signals of the comb filter 110 and 1D-BPF 120 using the weights to generate a C signal. The subtracter 150 subtracts the C signal from the input CVBS signal to generate a Y signal.

FIG. 2 illustrates a block diagram of another conventional video signal processing apparatus 200. Referring to FIG. 2, the video signal processing apparatus 200 includes a 2D-BPF 210, a subtracter 220 and a post-processor 230. The 2D-BPF 210 performs a two-dimensional convolution to extract a modulated C signal. The extracted C signal and a Y signal generated by the subtracter 220 are processed by the post-processor 230. When the 2D-BPF 210 carries out Y/C separation incorrectly, the post-processor 230 compensates the Y/C signal to generate a compensated Y/C signal.

In conventional Y/C separation techniques, when the edge of a detected image has high vertical correlation, Y/C separation is performed based on comb filtering and when the edge of a detected image has high horizontal correlation, Y/C separation is performed based on 1D bandpass filtering. As described above, when selecting one of these filtering methods according to a conventional Y/C separation technique, system performance largely depends on a threshold used for edge detection. That is, Y/C separation can be executed incorrectly or unstably when the filtering method is wrongly selected due to inaccurate edge detection. Conventional techniques that do not select one of the filtering methods but combine the results of the filtering operations can solve this problem to some extent. However, these techniques are based on horizontal or vertical one-dimensional filtering, and thus, artifacts may remain in the generated signal due to the inconstant edge directions.

In other words, when the direction in which the edge of an image extends is not uniform, cross-luma, which occurs when a C component exists in the separated Y signal, resulting in dotted artifacts, and cross-color, which occurs when a Y component exists in the separated C signal, resulting in a rainbow pattern artifact, can appear on a displayed image when Y/C separation is not properly performed by comb filtering or 1D bandpass filtering selected discretely.

To improve spatial filtering, spatio-temporal filtering is used by conventional video signal processing apparatuses. In this case, when processing a current pixel, the correlations of pixel data of the previous field and pixel data of the next field with the current pixel or the correlations of pixel data of the previous frame and pixel data of the next frame with the current pixel is considered. The spatio-temporal filtering method requires a memory for storing the pixel data of the previous and next fields or frames. Although the spatio-temporal filter is more expensive than the spatial filter, the spatio-temporal filtering technique is frequently used when images with high picture quality are required.

However, conventional Y/C separation techniques, which discontinuously select the spatial filter and the spatio-temporal filter in response to inter-frame/intra-frame correlation of the CVBS signal, cause artifacts such as cross-luma and cross-color when there is an error in the correlation measurement result. In addition, the conventional techniques have limitations in two-dimensional spatial Y/C separation. Furthermore, conventional Y/C separation techniques using intra-frame correlation have an advantage of using pixel data from the same spatial location. However, these techniques use data before and after one frame temporally distant by more than one field, resulting in deterioration of the spectrum characteristics of filters.

SUMMARY OF THE INVENTION

The present invention is therefore directed to a digital video signal processing apparatus and method, which substantially overcome one or more of the problems due to the limitations and disadvantages of the related art.

It is a feature of an embodiment of the present invention to provide a digital video signal processing apparatus used for both NTSC and PAL systems.

It is a feature of an embodiment of the present invention to adaptively and continuously perform field/frame-based Y/C separation in multiple directions according to temporal and spatial characteristics of an input video signal.

It is yet another feature of an embodiment of the present invention to use a spatio-temporal filter having spectral characteristics suitable for Y/C separation of the input video signal.

At least one of the above and other features and advantages of the present invention may be realized by providing a video signal processing method including generating 2D weight coefficients and 3D weight coefficients using data of a plurality of fields of an input video signal and generating a C signal of the input video signal by carrying out convolution of a horizontal coefficient mask, a vertical coefficient mask and a time coefficient mask, which are composed based on the weight coefficients, and corresponding data windows of the plurality of field data, wherein generating the C signal includes local vertical comb filtering, horizontal band pass filtering and 2D band pass filtering according to spatio-temporal local characteristics of the input video signal.

Local vertical comb filtering may be performed when local characteristics indicate high vertical correlation. Local horizontal band pass filtering may be performed when local characteristics indicate high horizontal correlation. 2D or 3D band pass filtering may be carried out when local characteristics indicate high or low correlation in multiple directions using at least three field data having an interval of one field.

The 2D weight coefficients may include a first coefficient proportional to vertical and upward correlations with the current pixel, a second coefficient proportional to vertical and downward correlations with the current pixel, a third coefficient proportional to horizontal and leftward correlations with the current pixel, and a fourth coefficient proportional to horizontal and rightward correlations with the current pixel.

The generated C signal may be subtracted from the input video signal and outputting as a Y signal.

Generating the C signal may include performing convolution of a corresponding data window of a first field data of the input video signal and a first filter mask, performing convolution of a corresponding data window of a second field data of the input video signal and a second filter mask, performing convolution of a corresponding data window of a third field data of the input video signal and a third filter mask, and combining the convolution results to output the combined result as the C signal, wherein the first, second and third filter masks are generated from 3D convolution of the horizontal coefficient mask, the vertical coefficient mask and the time coefficient mask.

The method may be applied to a PAL system or an NTSC system.

The first field data, the second field data and the third field data may have an interval of one field. The horizontal coefficient mask, the vertical coefficient mask and the time coefficient mask may each be one-dimensional. The 3D weight coefficients may include a first coefficient in proportion to a correlation between the currently processed pixel data and data of the field before the current field, and a second coefficient in proportion to a correlation between the currently processed pixel data and data of the field after the current field.

Generating the C signal may further include performing convolution of a corresponding data window of a fourth field data of the input video signal and a fourth filter mask, performing convolution of a corresponding data window of a fifth field data of the input video signal and a fifth filter mask, combining the five convolution results to be output the combined result as the generated C signal, wherein the time coefficient mask includes first and second coefficient masks, and the first to fifth filter masks are generated from 3D convolution of the horizontal coefficient mask, the vertical coefficient mask, the first coefficient mask and the second coefficient mask.

The 3D weight coefficients used for the first coefficient mask may include a first coefficient in proportion to the correlation in a first direction between the currently processed pixel data and data of the field before the current field, and a second coefficient in proportion to the correlation in the second direction between the currently processed pixel data and data of the field after the current field. The 3D weight coefficients used for the second coefficient mask may include a third coefficient in proportion to the correlation in a third direction between the currently processed pixel data and data of the field before the current field, and a fourth coefficient in proportion to the correlation in a fourth direction between the currently processed pixel data and data of the field after the current field.

At least one of the above and other features and advantages of the present invention may be realized by providing a video signal processing apparatus, including a weight determination unit to generate 2D weight coefficients and 3D weight coefficients using data of a plurality of fields of an input video signal and a filter to convolute a horizontal coefficient mask, a vertical coefficient mask and a time coefficient mask, the masks respectively composed of the weight coefficients, with corresponding data windows of the data of the plurality of fields to generate a C signal of the input video signal, wherein the filter adaptively performs local vertical comb filtering, horizontal band pass filtering and 2D band pass filtering in response to spatio-temporal local characteristics of the input video signal.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 4 illustrates chrominance signal phases of an NTSC system;

FIG. 5 illustrates chrominance signal phases of a PAL system;

DETAILED DESCRIPTION OF THE INVENTION

Figure 1:
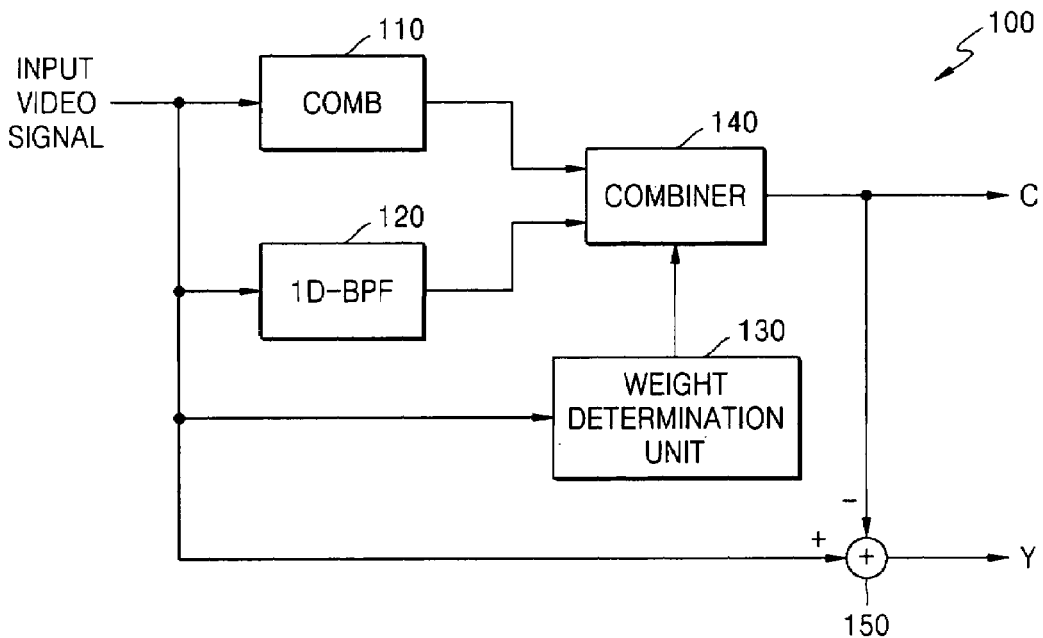
FIG. 1 illustrates a block diagram of a conventional video signal processing apparatus.
Figure 2:
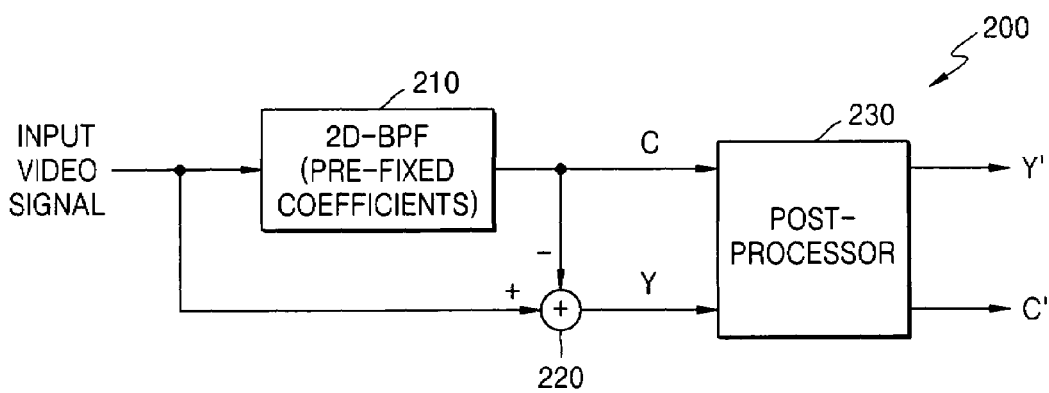
FIG. 2 illustrates a block diagram of another conventional video signal processing apparatus.

Korean Patent Application No. 10-2005-0003178, filed on Jan. 13, 2005, in the Korean Intellectual Property Office, and entitled "Digital Video Signal Processing Apparatus and Method for Adaptive and Temporal and Spatial Y/C Separation Based on Field Period," is incorporated by reference herein in its entirety.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 3:
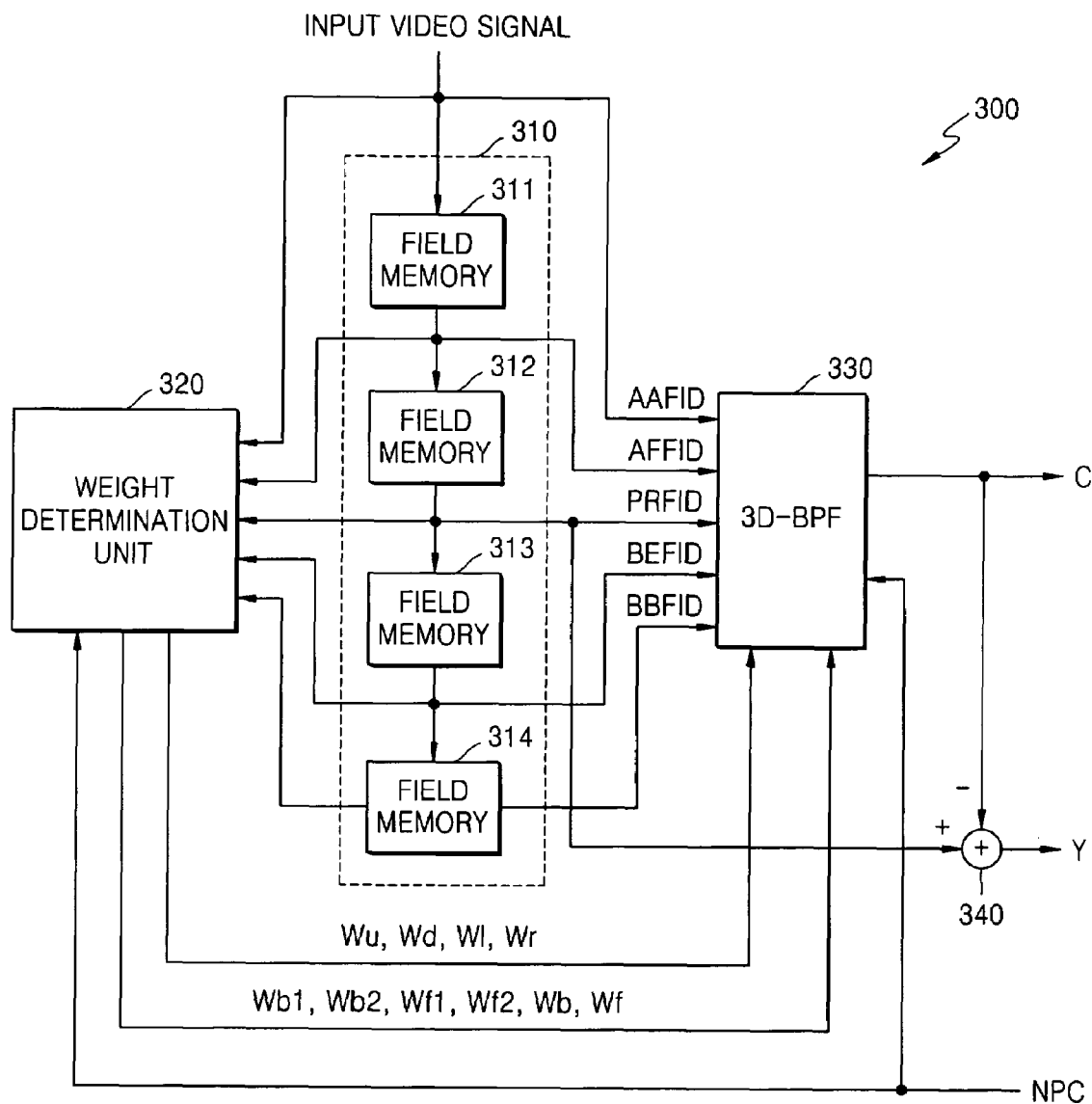
FIG. 3 illustrates a block diagram of a video signal processing apparatus according to an embodiment of the present invention.

FIG. 3 illustrates a block diagram of a video signal processing apparatus 300 according to an embodiment of the present invention. Referring to FIG. 3, the video signal processing apparatus 300 may include a memory 310, a weight determination unit 320, a 3D BPF 330, and a subtracter 340. The video signal processing apparatus 300 can be used for both NTSC systems and PAL systems. The video signal processing apparatus 300 receives a digital CVBS signal as an input video signal and separates the input video signal into a Y signal and a C signal. The input video signal can be a digital signal obtained by sampling the active video region of an analog CVBS signal at a predetermined frequency e.g., $4f_{sc}$, where $f_{sc}$ is a subcarrier frequency.

An input video signal CVBS(t) of the NTSC system can be represented as follows.

$$CVBS(t)=Y+U*\sin2\pi f_{SC}t+V*\cos2\pi f_{SC}t \qquad \text{[Equation 1]}$$

where U and V are C components, $f_{sc}$ is a subcarrier frequency, and t is time. Thus, in the NTSC system, pixel signals sampled at $4f_{sc}$ have chrominance signal phases as shown in FIG. 4. That is, the pixel signals are repeated in the form of Y+U, Y+V, Y−U, Y−V, . . . in each horizontal line. FIG. 4 shows only the phases of chrominance signal components. In the NTSC system, the chrominance signal phases are shifted by 180° in the vertical direction in neighboring horizontal scan lines, as shown in FIG. 4.

Figure 6:
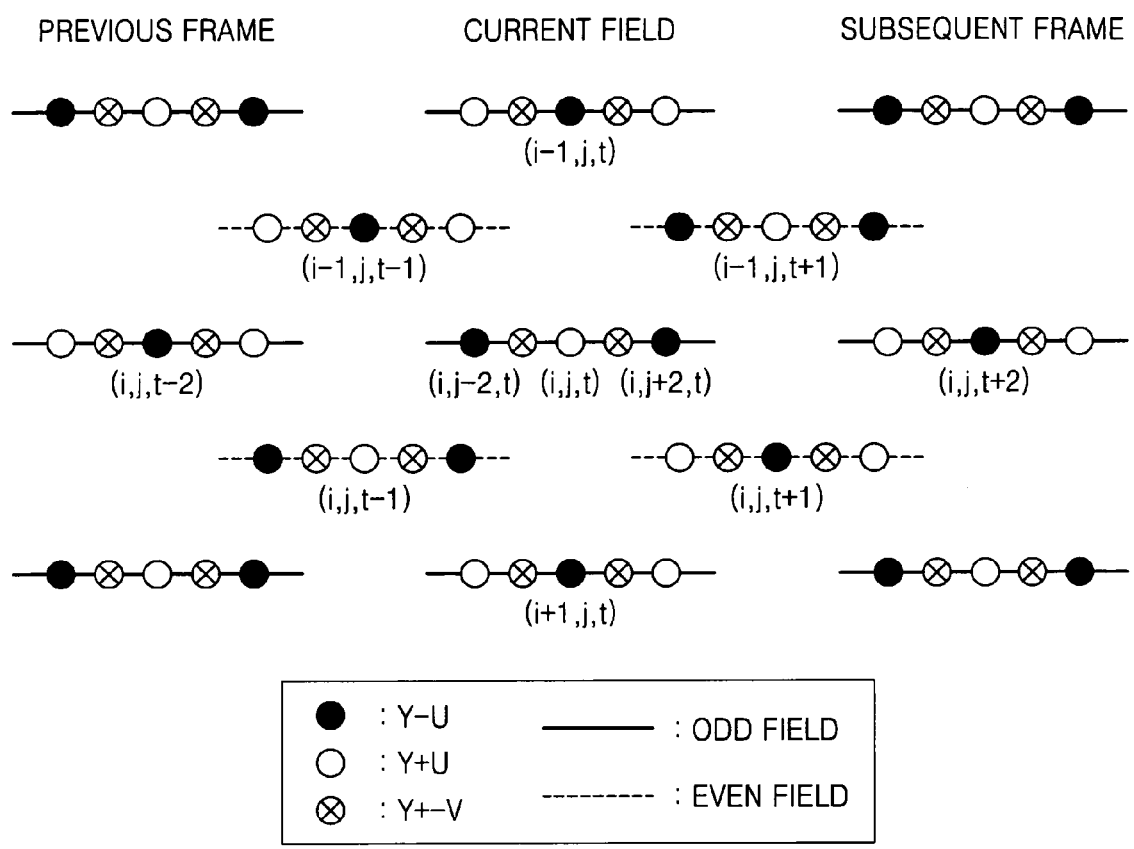
FIG. 6 illustrates spatio-temporal chrominance signal phases of the NTSC system.

The input video signal CVBS(t) of the NTSC system may be represented spatio-temporally, as shown in FIG. 6. Referring to FIG. 6, the phase of the C component of the currently processed central pixel at (i, j, t) has a particular phase, e.g., +U. Pixel signals spatio-temporally disposed in a first diagonal direction from the central pixel, i.e., a pixel at (i−1, j, t+1) of the next field and a pixel at (i, j, t−1) of the previous field, have the same phase as the central pixel. Pixel signals spatio-temporally disposed in a second diagonal direction from the central pixel, i.e., a pixel at (i, j, t+1) of the next field and a pixel at (i−1, j, t−1) of the previous field, have a phase opposite the phase, e.g., −U, of the C component of the central pixel at (i, j, t). In the NTSC/PAL system, one frame is composed of two fields, i.e., an odd field and an even field An input video signal CVBS(t) of a PAL system can be represented as follows.

$$CVBS(t)=Y+U*\sin2\pi f_{SC}t \pm V*\cos2\pi f_{SC}t \qquad \text{[Equation 2]}$$

where U and V are C components, $f_{sc}$ is a subcarrier frequency, and t is time. In Equation 2, the sign of the V component alternates between positive and negative every field. Thus, pixel signals in the PAL system have chrominance signal phases as shown in FIG. 5. That is, the pixel signals are repeated in the form of Y+U, Y+V, Y−U, Y−V, . . . or Y+U, Y−V, Y−U, Y+V, . . . . in each horizontal line, and the chrominance signal phases are shifted by 180° in the vertical direction every other horizontal scan line.

Figure 7:
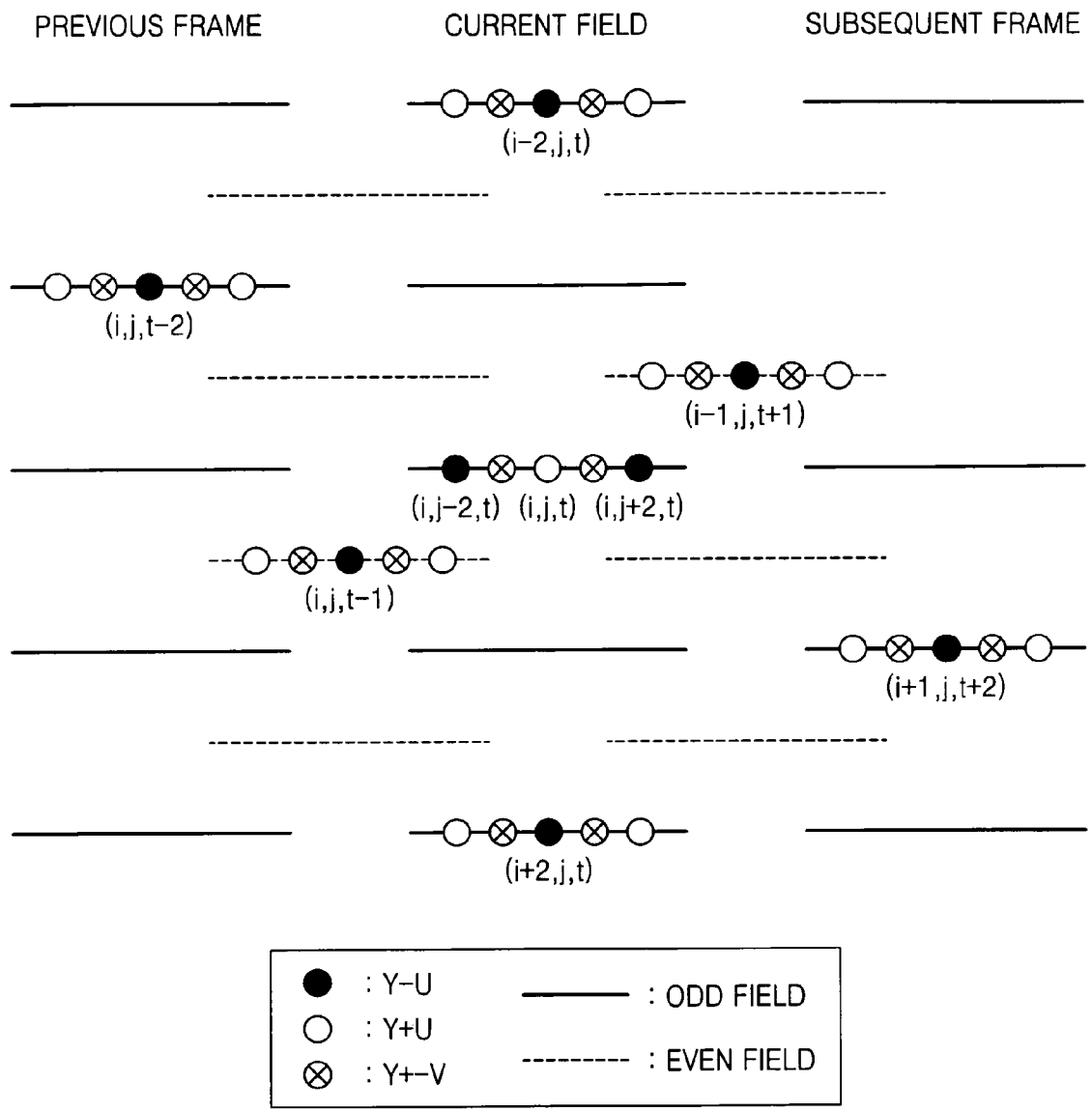
FIG. 7 illustrates spatio-temporal chrominance signal phases of the PAL system.

The input video signal CVBS(t) of the PAL system may be represented spatio-temporally, as shown in FIG. 7. Referring to FIG. 7, the phase of the C signal component of the currently processed central pixel at (i, j, t) has a particular phase, e.g., +U. Pixel signals spatio-temporally disposed in a diagonal direction from the current pixel, i.e., a pixel at (i−1, j, t+1) of the next field and a pixel at (i, j, t−1) of the previous field, have a phase opposite the phase of the current pixel signal (i, j, t) of the current field. A pixel at (i+1, j, t+2) located one frame (two fields) after the central pixel and a pixel at (i, j, t−2) located one frame (two fields) before the central pixel also have the phase opposite the phase of the current pixel at (i, j, t) of the current field. Pixels disposed vertically from the central pixel, i.e., pixels at (i−2, j, t) and (i+2, j, t) of the same field, also have the phase opposite the phase of the current pixel at (i, j, t) of the current field.

The Y and C signals (U and V signals) separated by the video signal processing apparatus 300 are converted to a format required for an external circuit and then stored or transmitted to a display device. For example, the Y and C signals can be interpolated with three color signals, e.g., red, green and blue color signals, to be displayed on a liquid crystal display (LCD).

Rather than discretely carrying out spatio-temporal comb filtering or 1D band pass filtering, the video signal processing apparatus 300 according to an embodiment of the present invention adaptively operates in response to spatio-temporal local characteristics of the input video signal CVBS. For this, the memory 310 stores digital data corresponding to a plurality of fields of the input video signal CVBS. The memory 310 includes a plurality of field memories 311, 312, 313 and 314 which each store data corresponding to one field. While FIG. 3 shows four field memories 311, 312, 313 and 314, more memories can be added to the digital video signal processing apparatus 300 if required for filtering.

The data corresponding to the plurality of fields, stored in the memory 310, and currently input video data are output to the weight determination unit 320. The weight determination unit 320 generates 2D weight coefficients Wu, Wd, Wl and Wr, which will be used for filtering in the 3D BPF 330, using the plurality of field data. Furthermore, the weight determination unit 320 generates 3D weight coefficients Wb1, Wb2, Wf1 and Wf2/Wb and Wf in response to a network parameter control (NPC) signal. For example, when the NPC signal has a logic high level, 3D weight coefficients Wb1, Wb2, Wf1 and Wf2 may be generated for the NTSC system having the chrominance signal phases shown in FIG. 4. When the control signal NPC has a logic low level, 3D weight coefficients Wb and Wf may be generated for the PAL system having the chrominance signal phases shown in FIG. 5. While the 2D weight coefficients Wu, Wd, Wl and Wr and the 3D weight coefficients Wb1, Wb2, Wf1 and Wf2/Wb and Wf may be generated for both the NTSC and PAL systems, data used to generate the coefficients for the NTSC system may be different from data used to generate the coefficients for the PAL system.

The 3D BPF 330 generates the C signal of the input video signal using the 2D weight coefficients Wu, Wd, Wl and Wr and the 3D weight coefficients Wb1, Wb2, Wf1 and Wf2/Wb and Wf. The 3D BPF 330 uses corresponding data windows of three fields or corresponding data windows of five fields, which will be convoluted with filter masks in response to the control signal NPC. For example, when the control signal NPC has a logic high level, the 3D BPF 330 may be operated for the NTSC system and use five data windows BBFID (before before field), BEFID, (before field), PRFID (present field), AFFID (after field) and AAFID (after after field). When the control signal NPC has a logic low level, the 3D BPF 330 may be operated for the PAL system and use three data windows BEFID, PRFID and AFFID.

The subtracter 340 subtracts the C signal (U or V signal), output from the 3D BPF 330, from the video signal CVBS of the currently processed pixel to obtain the Y signal. For example, when the U signal output as the C signal is subtracted from the video signal of the current pixel Y+U, the Y signal is obtained.

In the NTSC/PAL system, the 3D BPF 330 continuously and adaptively performs local vertical comb filtering, local horizontal band pass filtering and 2D/3D band pass filtering, in response to spatio-temporal local characteristics of the input video signal. That is, the 3D BPF 330 performs filtering using filter masks for convolution of field data items having an interval of one field. The 3D BPF 330 performs local vertical comb filtering if the local characteristics of the central pixel to be filtered show high vertical correlation, and executes local horizontal band pass filtering if the local characteristics show high horizontal correlation. Furthermore, the 3D BPF 330 performs 2D/3D band pass filtering if the local characteristics show high or low correlation in multiple directions.

The 3D BPF 330 performs filtering using the filter masks, that is, a horizontal coefficient mask, a vertical coefficient mask and a time coefficient mask, which are composed based on the 2D weight coefficients Wu, Wd, Wl and Wr and the 3D weight coefficients Wb1, Wb2, Wf1 and Wf2/Wb and Wf.

In the NTSC system, the time coefficient mask is composed of first and second time coefficient masks, and the 2D weight coefficients Wu, Wd, Wl and Wr and the 3D weight coefficients Wb1, Wb2, Wf1 and Wf2 are used for filtering. If the horizontal coefficient mask is $h_h(i, j, t)$, the vertical coefficient mask is $h_v(i, j, t)$, the first time coefficient mask is $h_{t1}(i, j, t)$ and the second time coefficient mask is $h_{t2}(i, j, t)$, then the C signal $C(i, j, t)$ output from the 3D BPF 330 is represented as follows.

$$C(i,j,t)=h(i,j,t)*CVBS(i,j,t)\ h(i,j,t)=h_h(i,j,t)*h_v(i,j,t)*h_{t1}(i,j,t)*h_{t2}(i,j,t)***CVBS(i,j,t)$$ [Equation 3]

That is, the 3D BPF 330 outputs the result of 3-dimensional convolution of the horizontal coefficient mask $h_h(i, j, t)$, the vertical coefficient mask $h_v(i, j, t)$, the first time coefficient mask $h_{t1}(i, j, t)$, the second time coefficient mask $h_{t2}(i, j, t)$ and the corresponding data window CVBS(i, j, t) of the plurality of field data items stored in the memory 310 as the C signal C(i, j, t) of the input video signal. The Y signal Y(i, j, t) output from the subtracter 340 is represented as the result of subtracting the C signal C(i, j, t) from the CVBS data CVBS(i, j, t) of the currently processed central pixel, which is represented as follows.

$$Y(i,j,t)=CVBS(i,j,t)-C(i,j,t)$$ [Equation 4]

The horizontal coefficient mask $h_h(i, j, t)$, the vertical coefficient mask $h_v(i, j, t)$, the first time coefficient mask $h_{t1}(i, j, t)$ and the second time coefficient mask $h_{t2}(i, j, t)$ have a 1-dimensional form as represented by Equation 5.

$$h_h = [Wl \quad Nh \quad Wr]$$
$$h_{t1} = [Wb1 \quad Nt1 \quad Wf1]$$
$$h_{t2} = [Wb2 \quad Nt2 \quad Wf2]$$
$$h_v = \begin{bmatrix} Wu \\ Nv \\ Wd \end{bmatrix}$$ [Equation 5]

In Equation 5, coefficients Nh, Nv, Nt1 and Nt2 can be set to values when normalization is carried out such that the sum of the absolute values of Nh, Nv, Nt1 and Nt2 and the absolute values of the 2D weight coefficients and 3D weight coefficients are equal to 1.

3D convolution of the four 1D coefficient masks $h_h$, $h_v$, $h_{t1}$ and $h_{t2}$ can be represented by Equation 6.

$$h_{hv}(i, j, t) =$$
$$h_h(i, j, t)***h_v(i, j, t) = \begin{vmatrix} Wl \cdot Wu & 0 & Wu & 0 & Wr \cdot Wu \\ Wl & 0 & Ns & 0 & Wr \\ Wl \cdot Wd & 0 & Wd & 0 & Wr \cdot Wd \end{vmatrix}$$
$$h_{t1t2}(i, j, t) = h_{t1}(i, j, t)***h_{t2}(i, j, t) =$$
$$\begin{vmatrix} 0 & 0 & Wb1 \cdot Wf2 & 0 & 0 \\ 0 & Wb1 & 0 & Wf2 & 0 \\ Wb1 \cdot Wb2 & 0 & Nt & 0 & Wf1 \cdot Wf2 \\ 0 & Wb2 & 0 & Wf1 & 0 \\ 0 & 0 & Wb2 \cdot Wf1 & 0 & 0 \end{vmatrix}$$ [Equation 6]

That is, C(i, j, t) of Equation 3 is arranged as C(i, j, t)=$h_{hv}$(i, j, t)* $h_{t1t2}$(i, j, t)*CVBS(i, j, t).

Figure 12:
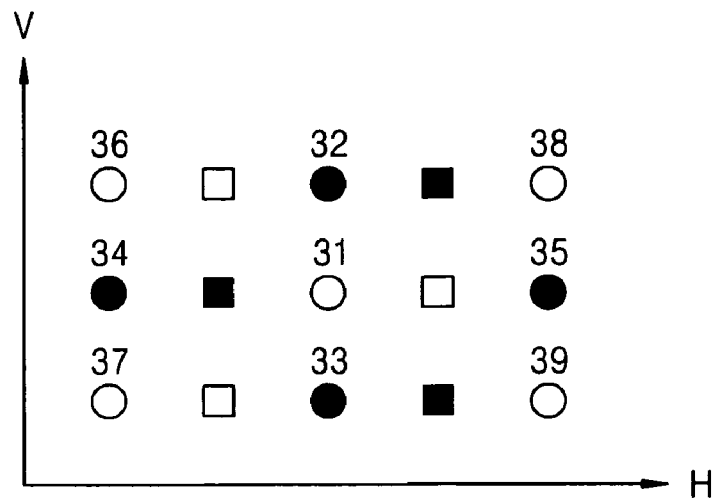
FIG. 12 is a diagram for explaining a vertical/horizontal filter coefficient of the NTSC system.
Figure 13:
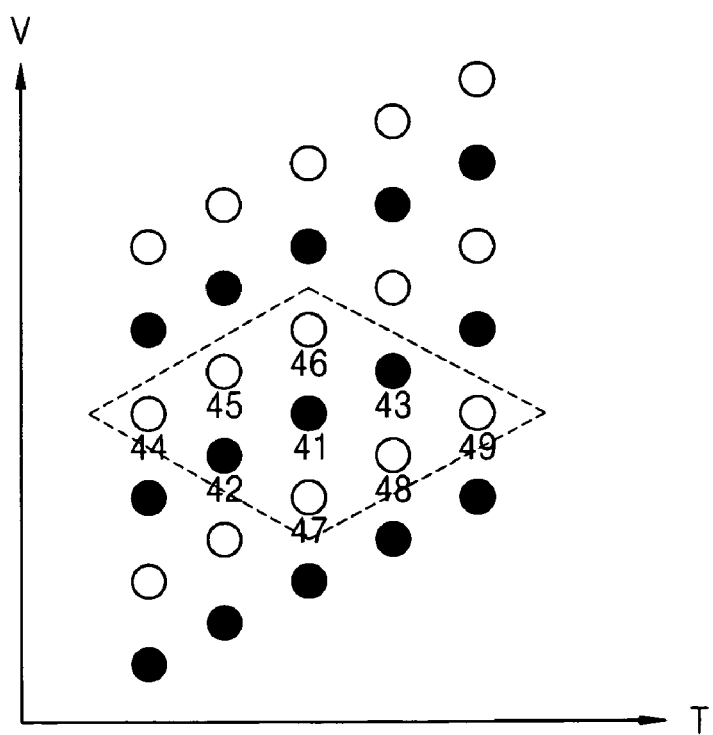
FIG. 13 illustrates a diagram for explaining a vertical/temporal filter coefficient of the NTSC system.

Pixel data items corresponding to the horizontal/vertical coefficient mask $h_{hv}$(i, j, t) and vertical/time coefficient mask $h_{t1t2}$(i, j, t) of the NTSC system are shown in FIGS. 12 and 13. Data items corresponding to elements composed of nonzero coefficients in the vertical/horizontal coefficient mask $h_{hv}$(i, j, t) in Equation 6, i.e., data items (32, 33, 34 and 35 of FIG. 12) in vertical and horizontal directions, which have the opposite C component phases to the central pixel (31 of FIG. 12), and pixel data items (36, 37, 38 and 39 of FIG. 12) in diagonal directions, which have the same C component phases as the central pixel, among digital data items of three continuous horizontal scan lines, are used for the aforementioned convolution. Furthermore, data items corresponding to elements composed of nonzero coefficients in the vertical/time coefficient mask $h_{t1t2}$(i, j, t) in Equation 6, i.e., the central pixel (41 of FIG. 13), data items (44, 45, 46, 47, 48 and 49 of FIG. 13) having the opposite C component phases to the central pixel, and pixel data items (42 and 43 of FIG. 13) having the same C component phases as the central pixel, among digital data items of three continuous horizontal scan lines arranged over five fields, are used for the aforementioned convolution.

In FIG. 13, vertical pixel data items along the time axis T represent data items of different fields. For example, pixel data 49 belongs to first field data, 43 and 48 belong to second field data, 41, 46 and 47 belong to third field data, 42 and 45 belong to fourth field data, and 44 belongs to fifth field data.

Here, the currently processed central pixel 41 belongs to the third field data. As described above, coefficient masks used for convolution are determined according to Equation 6.

The result of 3D convolution of Equation 3 is identical to the result of 3D convolution of the spatial domain coefficient mask $h_{hv}$ and the time domain coefficient mask $h_{t1t2}$ in Equation 6. Since $h_{t1t2}$ extends over five fields along the time axis, coefficient masks for the respective fields of Equation 3 are defined in the five fields. When the coefficient masks convoluted in these fields are respectively referred to as $h_1(i, j, t)$, $h_2(i, j, t)$, $h_3(i, j, t)$, $h_4(i, j, t)$ and $h_5(i, j, t)$, data items, which are 2D-convoluted with the first through fifth coefficient masks $h_1$, $h_2$, $h_3$, $h_4$ and $h_5$, are CVBS data windows BBFID, BEFID, PRFID, AFFID and AAFID of five fields having an interval of one field. That is, the currently processed field data window PRFID and $h_3(i, j, t)$ is convoluted. In addition, previous field data windows BBFID and BEFID and next field data windows AFFID and AAFID are convoluted with the filter masks $h_1(i, j, t)$, $h_2(i, j, t)$, $h_3(i, j, t)$ and $h_5(i, j, t)$, respectively. In Equation 6, Ns=Nh*Nv.

In the PAL system, there is a single time coefficient mask and the 2D weight coefficients Wu, Wd, Wl and Wr and the 3D weight coefficients Wb and Wf are used. If the horizontal coefficient mask is $h_h(i, j, t)$, the vertical coefficient mask is $h_v(i, j, t)$, and the time coefficient mask is $h_t(i, j, t)$, then the C signal C(i, j, t) output from the 3D BPF 330 is represented as follows.

$$C(i,j,t)=h(i,j,t)*CVBS(i,j,t)\ h(i,j,t)=h_h(i,j,t)*h_v(i,j,t)***h_t(i,j,t) \quad \text{[Equation 7]}$$

That is, the 3D BPF 330 outputs the result of 3-dimensional convolution of the horizontal coefficient mask $h_h(i, j, t)$, the vertical coefficient mask $h_v(i, j, t)$, the time coefficient mask $h_t(i, j, t)$ and the corresponding data window CVBS(i, j, t) of the plurality of field data items stored in the memory 310 as the C signal C(i, j, t) of the input video signal. The Y signal Y(i, j, t) output from the subtracter 340 is represented by Equation 4.

The horizontal coefficient mask $h_h(i, j, t)$, the vertical coefficient mask $h_v(i, j, t)$ and the time coefficient mask $h_t(i, j, t)$ have a 1-dimensional form as represented by Equation 8.

$$h_h(i, j, t) = [Wl\ Nh\ Wr] \quad \text{[Equation 8]}$$

$$h_t(i, j, t) = [Wb\ Nt\ Wf]$$

$$h_v(i, j, t) = \begin{bmatrix} Wu \\ Nv \\ Wd \end{bmatrix}$$

In Equation 8, coefficients Nh, Nv and Nt can be set to values when normalization is carried out such that the sum of the absolute values of Nh, Nv and Nt and the absolute values of the 2D weight coefficients and 3D weight coefficients is equal to 1.

3D spatial masks obtained from the three 1D coefficient masks $h_h$, $h_v$ and $h_t$ of Equation 7 are respectively composed of $h_1(i, j, t)$, $h_2(i, j, t)$ and $h_3(i, j, t)$ represented by Equation 9.

$$h_1(i, j, t) = \begin{bmatrix} Wb \cdot Wl \cdot Wu & 0 & Wb \cdot Wu & 0 & Wb \cdot Wr \cdot Wu \\ Wb \cdot Wl & 0 & Ns \cdot Wb & 0 & Wb \cdot Wr \\ Wb \cdot Wl \cdot Wd & 0 & Wb \cdot Wd & 0 & Wb \cdot Wr \cdot Wd \end{bmatrix} \quad \text{[Equation 9]}$$

$$h_2(i, j, t) = \begin{bmatrix} Nt \cdot Wl \cdot Wu & 0 & Nt \cdot Wu & 0 & Nt \cdot Wr \cdot Wu \\ Nt \cdot Wl & 0 & Ns \cdot Nt & 0 & Nt \cdot Wr \\ Nt \cdot Wl \cdot Wd & 0 & Nt \cdot Wd & 0 & Nt \cdot Wr \cdot Wd \end{bmatrix}$$

$$h_3(i, j, t) = \begin{bmatrix} Wf \cdot Wl \cdot Wu & 0 & Wf \cdot Wu & 0 & Wf \cdot Wr \cdot Wu \\ Wf \cdot Wl & 0 & Ns \cdot Wf & 0 & Wf \cdot Wr \\ Wf \cdot Wl \cdot Wd & 0 & Wf \cdot Wd & 0 & Wf \cdot Wr \cdot Wd \end{bmatrix}$$

Accordingly, the data CVBS(i, j, t) used for the convolution of the 3D BPF 330, represented by Equation 7, includes three data windows corresponding to the filter masks $h_1$, $h_2$ and $h_3$. That is, CVBS data of a 3×5 matrix corresponding to each of the filer masks of Equation 9 is used for the convolution of Equation 3. In Equation 9, $h_2(i, j, t)$ is the coefficient mask for the currently processed field, $h_1(i, j, t)$ is the coefficient mask for the previous field, and $h_3(i, j, t)$ is the coefficient mask for the next field. That is, data items BEFID, PRFID and AFFID of three fields having an interval of one field are used for the 3D convolution of Equation 3.

In Equations 5 and 8, Wu, Wd, Wl and Wr are weights applied to the pixels (−U of FIG. 4) having the opposite phase to the central pixel (i, j) in the currently processed field, and they have values of −0.5 to 0 in response to the spatial local characteristics of an image in each direction. Accordingly, diagonal weights WuWl, WdWl, WuWr and WdWr respectively have values of 0 to 0.25 in response to the local characteristics of the image. In addition, the 3D weight coefficients Wb1, Wb2, Wf1 and Wf2/Wb and Wf are used for reflecting a motion variation on the time axis. The 3D weight coefficients Wb1, Wb2, Wf1 and Wf2/Wb and Wf have values of −0.5 to 0 for pixels having the opposite phase to the central pixel (i, j) and values of 0 to 0.5 for pixels having the same phase as the central pixel (i, j). The 3D weight coefficients Wb1, Wb2, Wf1 and Wf2/Wb and Wf can use any value that represents correlation on the time axis.

Figure 8:
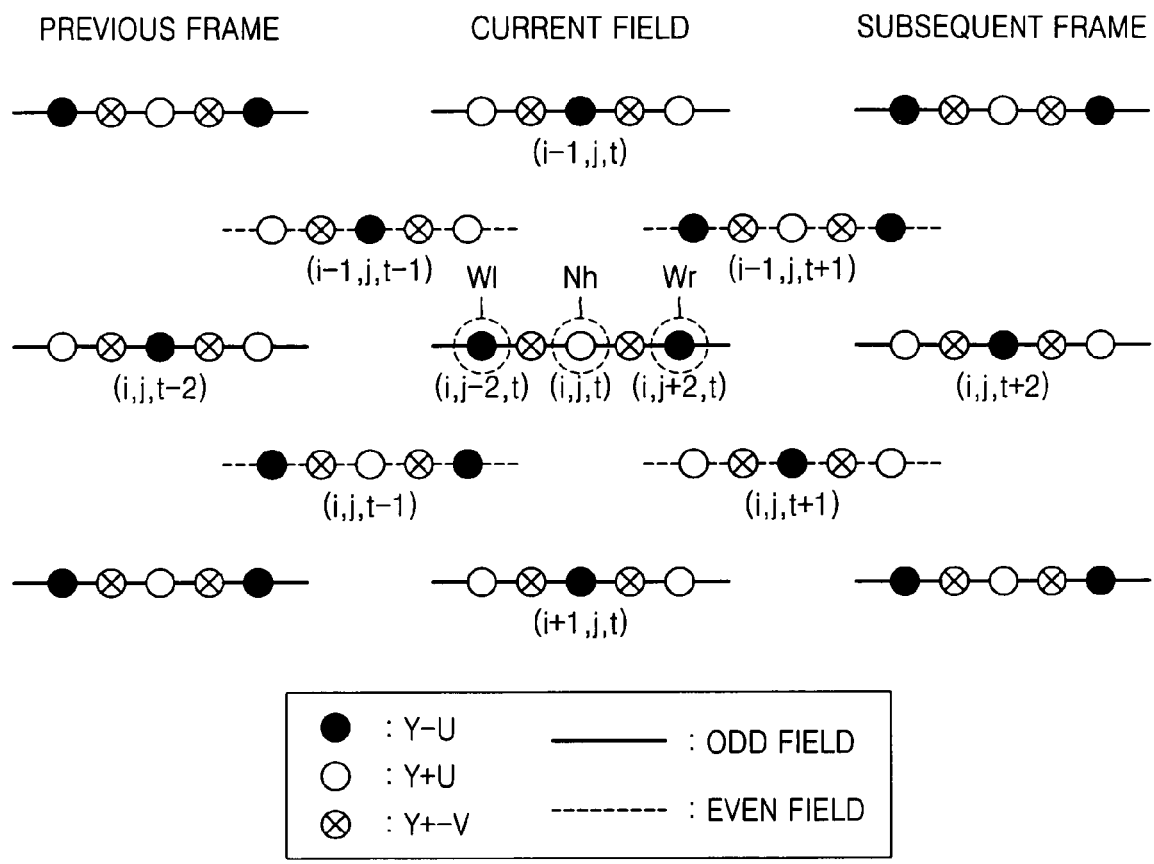
FIG. 8 illustrates a diagram for explaining a horizontal filter coefficient of the NTSC system.
Figure 9:
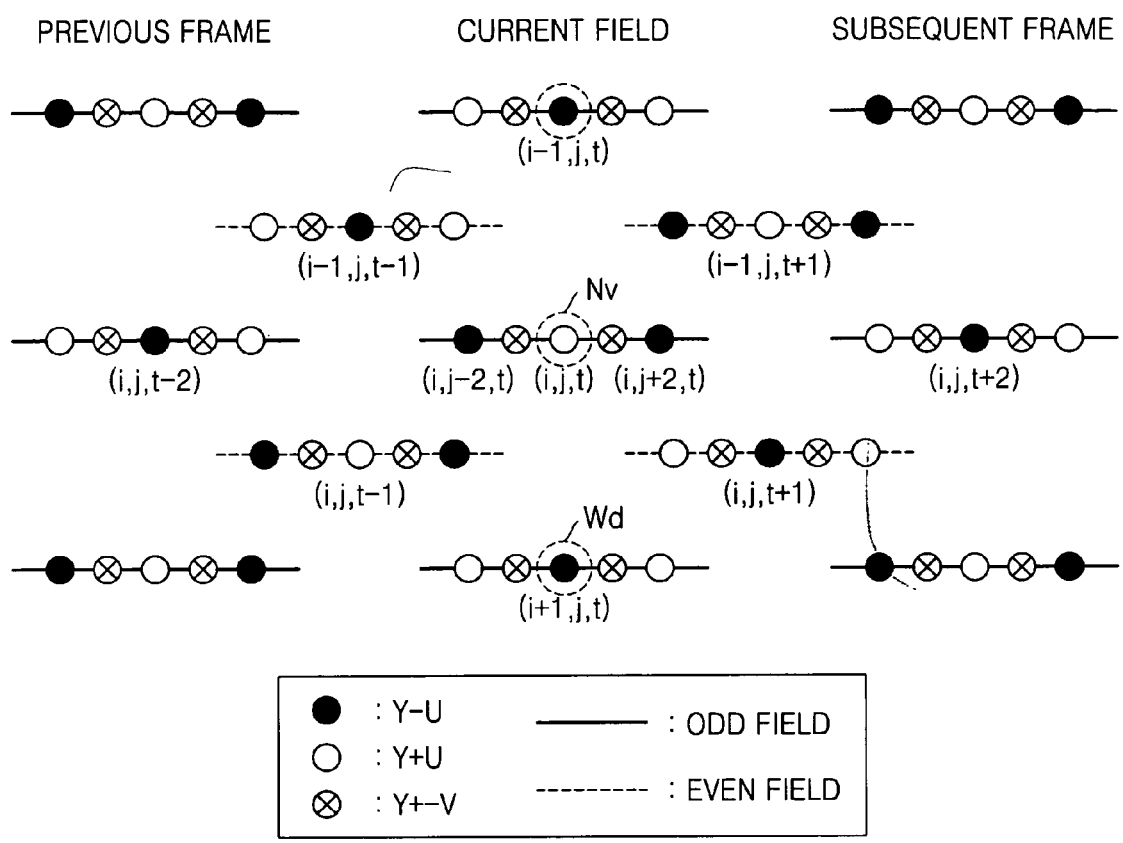
FIG. 9 illustrates a diagram for explaining a vertical filter coefficient of the NTSC system.
Figure 10:
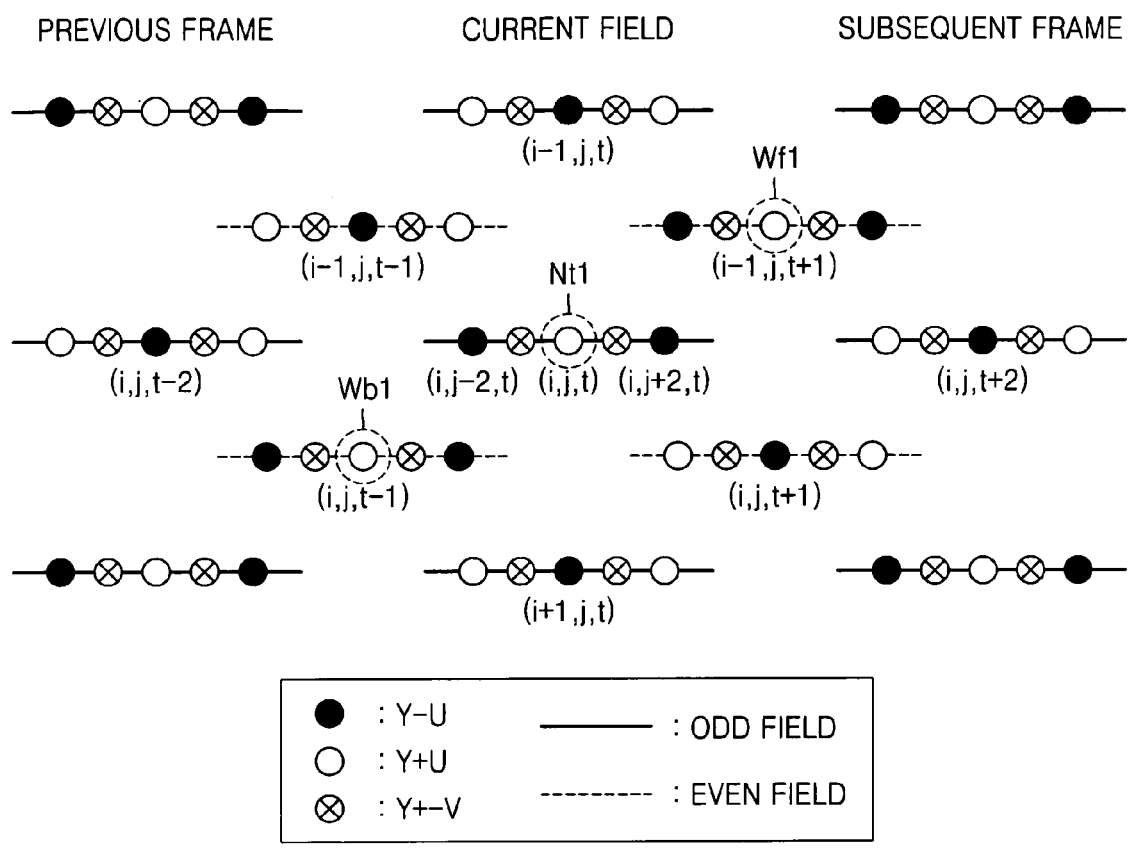
FIG. 10 is a diagram for explaining a first temporal filter coefficient of the NTSC system.
Figure 11:
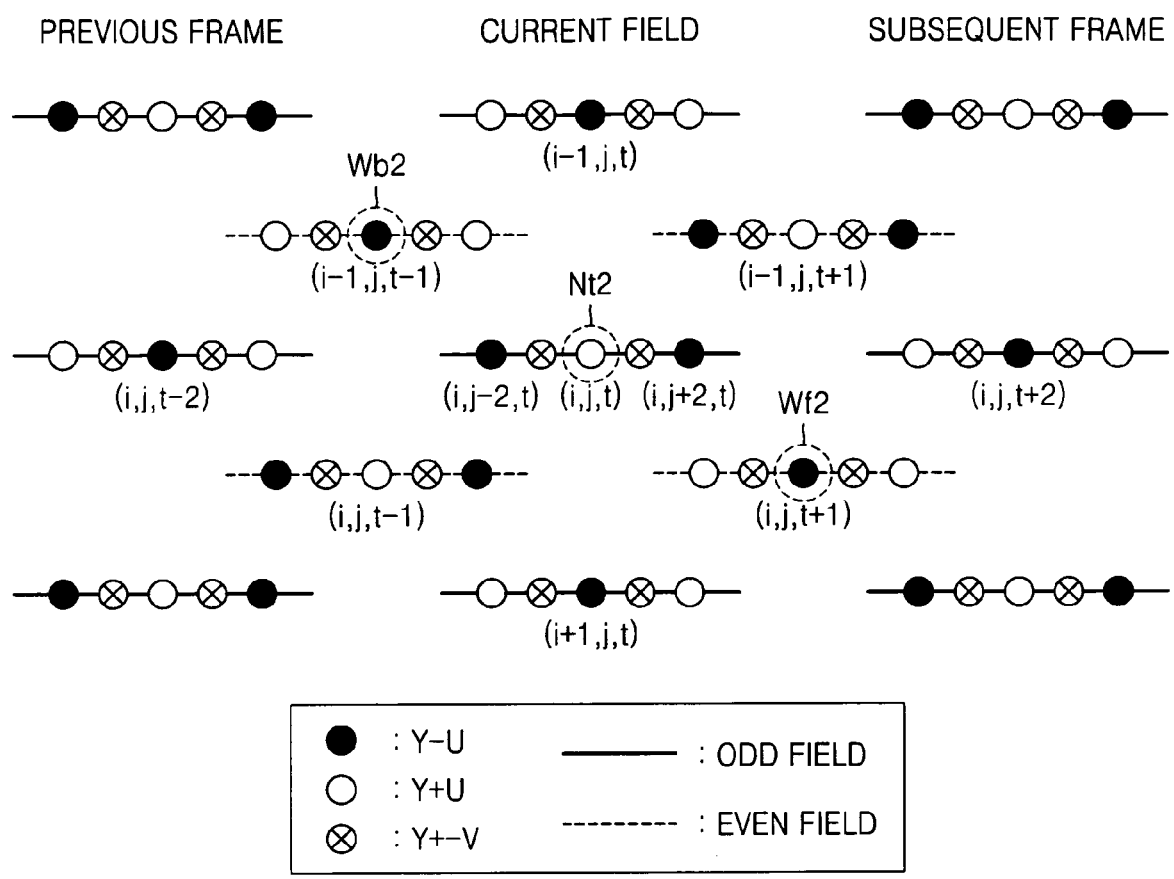
FIG. 11 illustrates a diagram for explaining a second temporal filter coefficient of the NTSC system.
Figure 14:
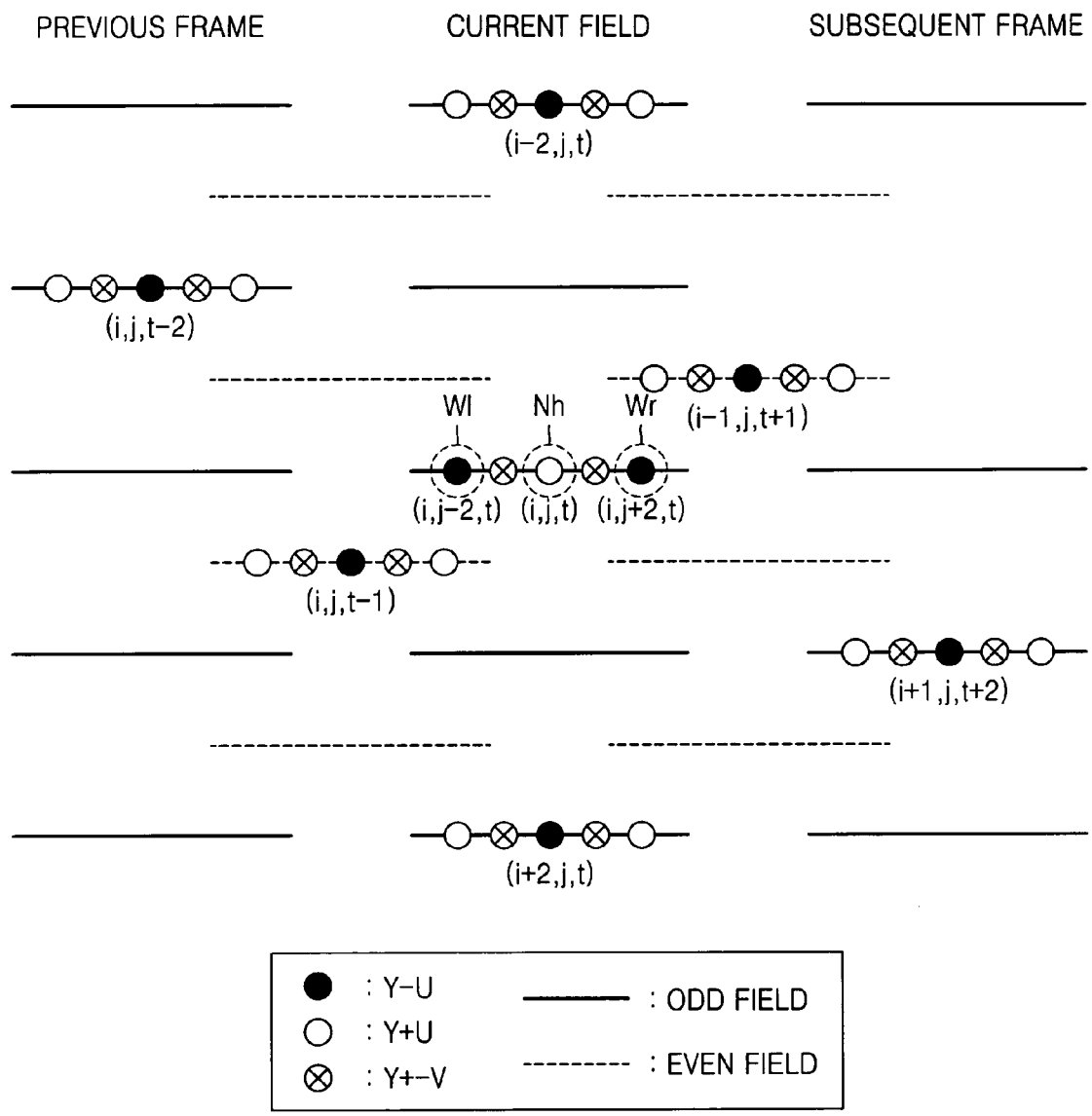
FIG. 14 illustrates a diagram for explaining a horizontal filter coefficient of the PAL system.
Figure 15:
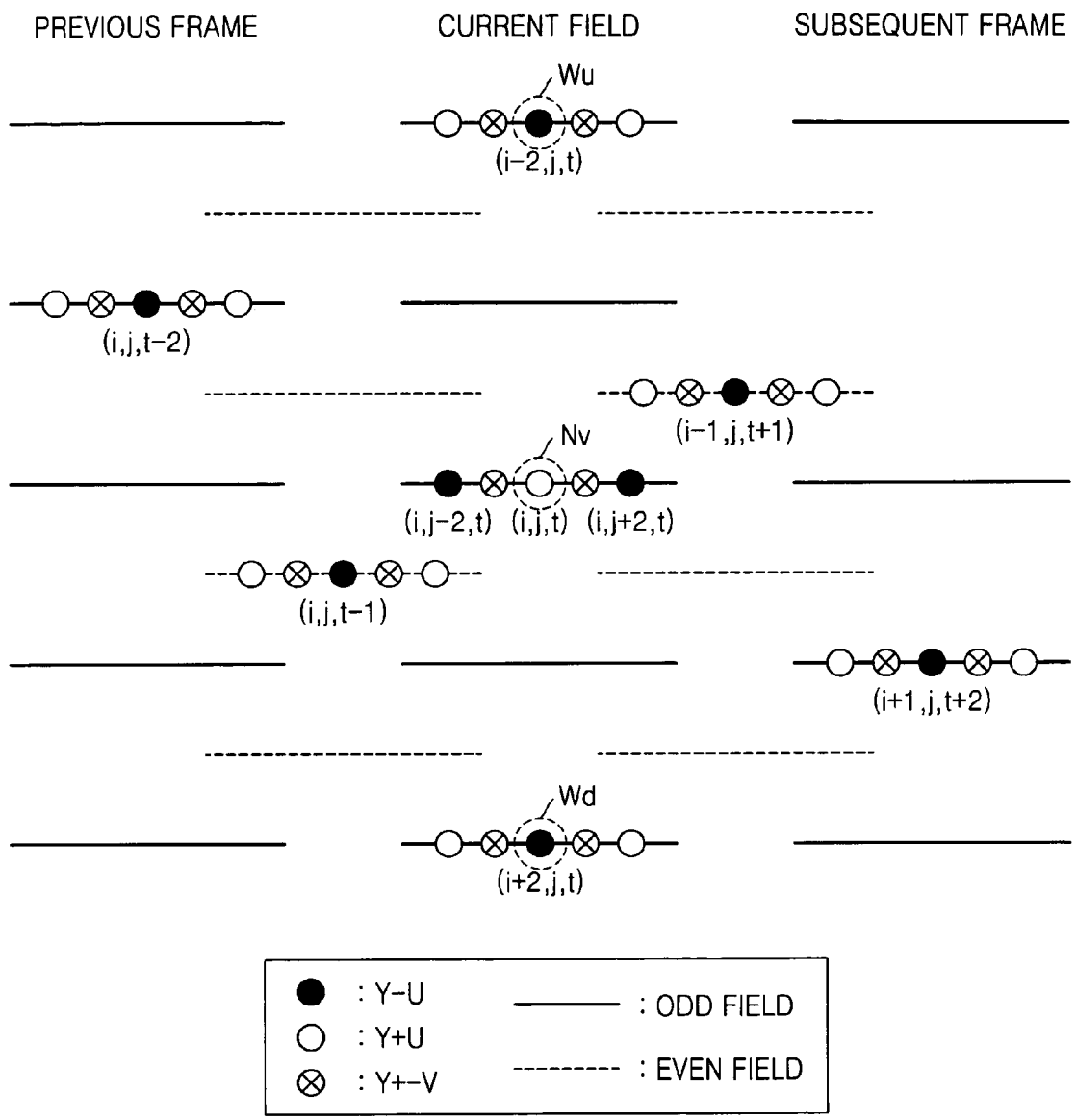
FIG. 15 illustrates a diagram for explaining a vertical filter coefficient of the PAL system.
Figure 16:
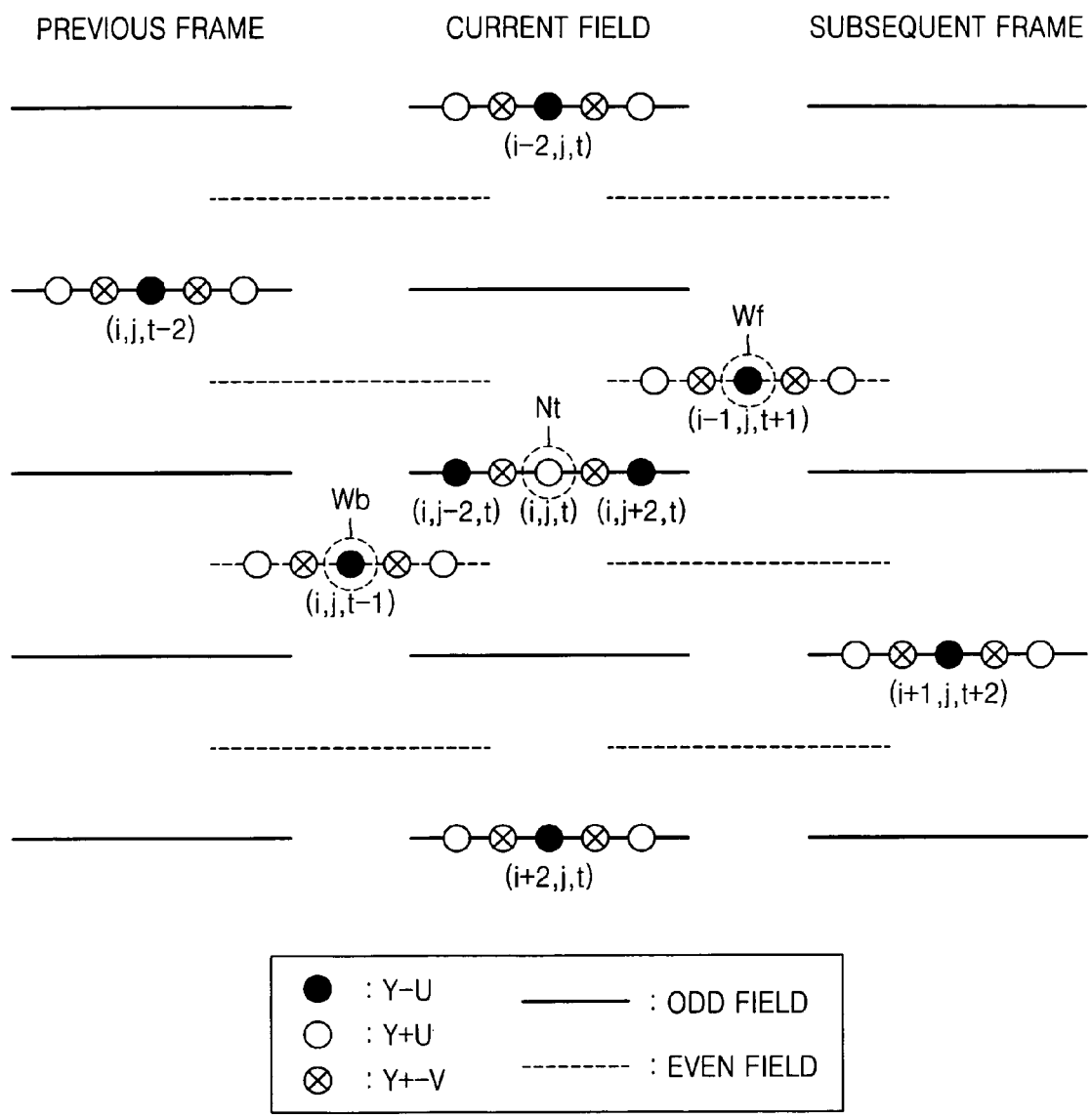
FIG. 16 illustrates a diagram for explaining a temporal filter coefficient of the PAL system.

Specifically, referring to FIG. 8 (NTSC system) and FIG. 14 (PAL sys tem), Nh is applied to the currently processed central pixel (i, j, t), Wl is applied to a pixel (i, j−2, t) located two pixels to the left of the central pixel (i, j, t), and Wr is applied to a pixel (i, j+2, t) located two pixels to the right of the central pixel (i, j, t). Referring to FIG. 9 (NTSC system) and FIG. 15 (PAL system), Nv is applied to the currently processed central pixel (i, j, t) and Wu is applied to a pixel (i−1, j, t) one horizontal scan line above the central pixel (i, j, t) in the NTSC system and to a pixel (i−2, j, t) two horizontal scan lines above the central pixel (i, j, t) in the PAL system. Wd is applied to a pixel (i+1, j, t) one horizontal scan line under the central pixel (i, j, t) in the NTSC system and to a pixel (i+2, j, t) two horizontal scan lines under the central pixel (i, j, t) in the PAL system. Referring to FIGS. 10 and 11, in the NTSC system, Nt1 and Nt2 are applied to the central pixel (i, j, t) of the currently processed field. Wb1 and Wb2 are respectively applied to a pixel (i, j, t−1) and a pixel (i−1, j, t−1) in data of the field before the current field. The pixel (i, j, t−1) and a pixel (i−1, j, t−1) are located in positions corresponding to the position of the central pixel (i, j, t) of the current field and respectively have the same and the opposite phase to the currently processed central pixel (i, j, t). In addition, Wf1 and Wf2 are respectively applied to a pixel (i−1, j, t+1) and a pixel (i, j, t+1) in data of the field after the current field. Here, the pixel (i−1, j, t+1) and the pixel (i, j, t+1) are located in positions corresponding to the position of the central pixel (i, j, t) of the current field and respectively have the same and the opposite phase to the currently processed central pixel (i, j, t). Referring to FIG. 16, in the PAL system, Nt is applied to the central pixel (i, j, t) of the currently processed field, and Wb is applied to a pixel (i, j, t−1) in data of the field before the current field, which is located in the position corresponding to the position of the central pixel (i, j, t) of the current field. In addition, Wf is applied to a pixel (i−1, j, t+1) in data of the field after the current field, which is located in the position corresponding to the position of the central pixel (i, j, t) of the current field.

The 2D weight coefficients Wu, Wd, Wl and Wr and 3D weight coefficients Wb1, Wb2, Wf1 and Wf2 used in Equation 5 are determined such that they satisfy Equation 10. The 2D weight coefficients Wu, Wd, Wl and Wr and 3D weight coefficients Wb and Wf used in Equation 8 are determined such that they satisfy Equation 11.

$$|Wu| \propto (VARh \,\&\, VARt)\left(or\, \frac{1}{VARv}\right) \text{ and } |Wu| \propto$$
$$\frac{1}{VARu}(or\, VARd) \quad \text{[Equation 10]}$$

$$|Wd| \propto (VARh \,\&\, VARt)\left(or\, \frac{1}{VARv}\right) \text{ and } |Wd| \propto$$
$$\frac{1}{VARd}(or\, VARu)$$

$$|Wl| \propto (VARv \,\&\, VARt)\left(or\, \frac{1}{VARh}\right) \text{ and } |Wl| \propto$$
$$\frac{1}{VARl}(or\, VARr)$$

$$|Wr| \propto (VARv \,\&\, VARt)\left(or\, \frac{1}{VARh}\right) \text{ and } |Wr| \propto$$
$$\frac{1}{VARr}(or\, VARl)$$

$$|Wb1| \propto (VARv \,\&\, VARh)\left(or\, \frac{1}{VARt1}\right) \text{ and } |Wb1| \propto$$
$$\frac{1}{VARb1}(or\, VARf1)$$

$$|Wf1| \propto (VARv \,\&\, VARh)\left(or\, \frac{1}{VARt1}\right) \text{ and } |Wf1| \propto$$
$$\frac{1}{VARf1}(or\, VARb1)$$

$$|Wb2| \propto (VARv \,\&\, VARh)\left(or\, \frac{1}{VARt2}\right) \text{ and } |Wb2| \propto$$
$$\frac{1}{VARb2}(or\, VARf2)$$

$$|Wf2| \propto (VARv \,\&\, VARh)\left(or\, \frac{1}{VARt2}\right) \text{ and } |Wf2| \propto$$
$$\frac{1}{VARf2}(or\, VARb2)$$

$$|Wu| \propto (VARh \,\&\, VARt)\left(or\, \frac{1}{VARv}\right) \text{ and } |Wu| \propto \quad \text{[Equation 11]}$$
$$\frac{1}{VARu}(or\, VARd)$$

$$|Wd| \propto (VARh \,\&\, VARt)\left(or\, \frac{1}{VARv}\right) \text{ and } |Wd| \propto$$
$$\frac{1}{VARd}(or\, VARu)$$

$$|Wl| \propto (VARv \,\&\, VARt)\left(or\, \frac{1}{VARh}\right) \text{ and } |Wl| \propto$$
$$\frac{1}{VARl}(or\, VARr)$$

$$|Wr| \propto (VARv \,\&\, VARt)\left(or\, \frac{1}{VARh}\right) \text{ and } |Wr| \propto$$
$$\frac{1}{VARr}(or\, VARl)$$

$$|Wb| \propto (VARv \,\&\, VARh)\left(or\, \frac{1}{VARt}\right) \text{ and } |Wb| \propto$$
$$\frac{1}{VARb}(or\, VARf)$$

$$|Wf| \propto (VARv \,\&\, VARh)\left(or\, \frac{1}{VARt}\right) \text{ and } |Wf| \propto$$
$$\frac{1}{VARf}(or\, VARb)$$

In Equations 10 and 11, VARv denotes a vertical variation in the spatial domain, VARh represents a horizontal variation in the spatial domain, and VARt, VARt1 and VARt2 represent temporal variations in the time domain. VARu denotes an upward variation in the spatial domain, and VARd is a downward variation in the spatial domain; VARl denotes a leftward variation in the spatial domain, and VARr is a rightward variation in the spatial domain; VARb, VARb1 and VARb2 denote previous variations in the time domain, and VARf, VARf1, VARf2 are subsequent variations in the time domain.

To represent Equations 10 and 11 in more detail, values of Equation 12 are proposed.

$$Wu = -0.5 \times \frac{Difh + Dift}{Difh + Difv + Dift} \times \frac{Difd}{Difu + Difd} \quad \text{[Equation 12]}$$

$$Wd = -0.5 \times \frac{Difh + Dift}{Difh + Difv + Dift} \times \frac{Difu}{Difu + Difd}$$

$$Wl = -0.5 \times \frac{Difv + Dift}{Difh + Difv + Dift} \times \frac{Difr}{Difr + Difl}$$

$$Wr = -0.5 \times \frac{Difv + Dift}{Difh + Difv + Dift} \times \frac{Difl}{Difr + Difl}$$

$$Wf = -0.5 \times \frac{Difv + Difh}{Difh + Difv + Dift} \times \frac{Difb}{Diff + Difb}$$

$$Wb = -0.5 \times \frac{Difv + Difh}{Difh + Difv + Dift} \times \frac{Diff}{Diff + Difb}$$

Figure 17:
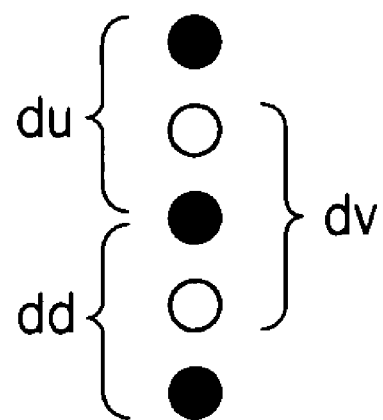
FIG. 17 illustrates a vertical variation in pixels.
Figure 18:
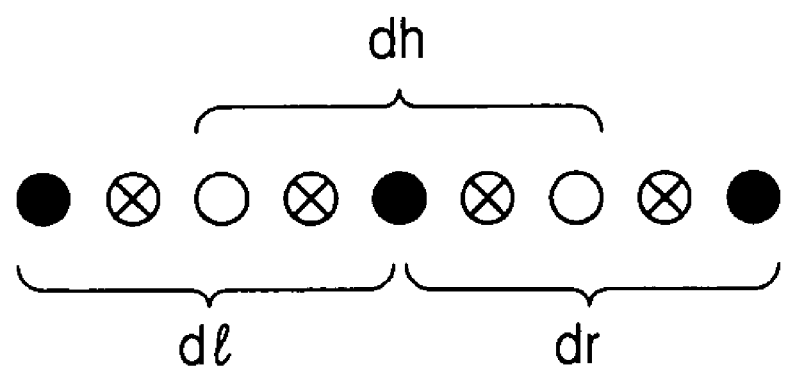
FIG. 18 illustrates a horizontal variation in pixels.

In Equation 12, Difv is the absolute value of a vertical difference of the input video signal, Difh is the absolute value of a horizontal difference, Difu is the absolute value of an upward difference, and Difd is the absolute value of a downward difference. In addition, Difl is the absolute value of a leftward difference and Difr is the absolute value of a rightward difference. FIGS. 17 and 18 are diagrams for explaining vertical and horizontal variations in pixels of the NTSC system. Referring to FIG. 17, Difv=du+dd+dv, Difu=Du and Difd=dd for the currently processed central pixel (i, j). Referring to FIG. 18, Difh=dl+dr+dh, Difl=dl and Difr=dr. Here, dl is the absolute value of the difference between the pixel data (i, j) and pixel data (i, j−4), dr is the absolute value of the difference between the pixel data (i, j) and pixel data (i, j+4), and dh is the absolute value of the difference between the pixel data (i, j−2) and pixel data (i, j+2). Furthermore, du is the absolute value of the difference between the pixel data (i, j) and pixel data (i−2, j), dd is the absolute value of the difference between the pixel data (i, j) and pixel data (i+2, j), and dv is the absolute value of the difference between pixel data (i−1, j) and pixel data (i+1, j) in the NTSC system.

In the PAL system, du is the absolute value of the difference between the pixel data (i, j) and pixel data (i−4, j), dd is the absolute value of the difference between the pixel data (i, j) and pixel data (i+4, j), and dv is the absolute value of the difference between pixel data (i−2, j) and pixel data (i+2, j). Furthermore, Dift denotes a variation on the time axis, and Diff and Difb represent variations to subsequent and previous field directions. Here, Dift, Diff and Difb are calculated by combining pixels having the same phase as the current pixel on the time axis. In addition, the weights Wu, Wd, Wl, Wr, Wf and Wb can be determined such that they represent horizontal/vertical/temporal/leftward/rightward/upward/downward variations using various combinations of pixel data items having the same phase.

Consequently, Wu may be proportional to the vertical and upward correlation for the central pixel (i, j). Wd may be proportional to the vertical and downward correlation for the central pixel (i, j). Wl may be proportional to the horizontal and leftward correlation for the central pixel (i, j). Wr may be proportional to the horizontal and rightward correlation for the central pixel (i, j). Wb may be proportional to the correlation of the currently processed central pixel and data of the field before the current pixel, or the difference between pixels in data of the field/frame before the current field, which have the same phase as the currently processed central pixel, as shown in FIG. 16. Furthermore, Wf may be proportional to the correlation of the currently processed central pixel and data of the field after the current pixel, or the difference between pixels in data of the field/frame after the current field, which have the same phase as the currently processed central pixel, In the NTSC system, Wb1 may be proportional to the correlation of the currently processed central pixel and data of the field before the current pixel, or the difference between the central pixel and a pixel in data of the field/frame before the current field, which have the same phase as the currently processed central pixel (i, j, t) in a first direction, as shown in FIG. 10. Wf1 may be proportional to the correlation of the currently processed central pixel and data of the field after the current pixel, or the difference between the central pixel and a pixel in data of the field/frame after the current field, which have the same phase as the currently processed central pixel (i, j, t) in a second direction. Furthermore, Wb2 may be proportional to the correlation of the currently processed central pixel and data of the field before the current pixel, or the difference between the central pixel and a pixel in data of the field/frame before the current field, which have the opposite phase to the currently processed central pixel (i, j, t) in a third direction, as shown in FIG. 11. Wf2 may be proportional to the correlation of the currently processed central pixel and data of the field after the current pixel, or the difference between the central pixel and a pixel in data of the field/frame after the current field, which have the opposite phase to the currently processed central pixel (i, j, t) in a fourth direction, as shown in FIG. 11.

The 3D BPF 330 performs filtering through convolution of Equation 3 using the 2D weight coefficients Wu, Wd, Wl and Wr and the third weight coefficients Wb1, Wb2, Wf1 and Wf2/Wb and Wf, which are determined as above.

Figure 19:
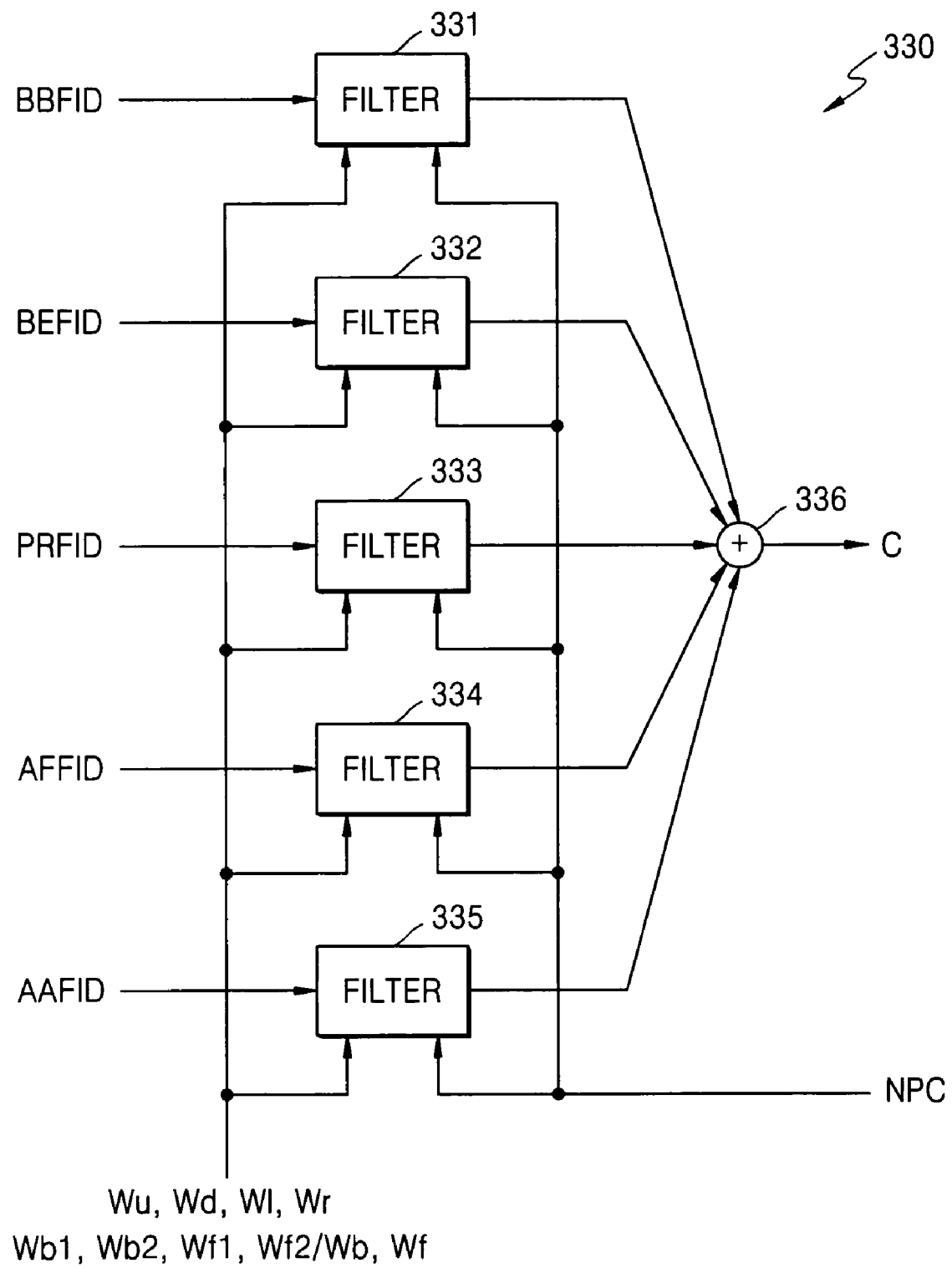
FIG. 19 illustrates a block diagram of the 3D BPF of FIG. 3.

FIG. 19 is a block diagram of the 3D BPF 330 of FIG. 3. Referring to FIG. 19, the 3D BPF 330 includes a first filter 331, a second filter 332, a third filter 333, a fourth filter 334, a fifth filter 335, and a combiner 336. The 3D BPF 330 may perform NTSC or PAL system operation in response to the control signal NPC.

When the control signal NPC has a logic high level, for example, the 3D BPF 330 may perform NTSC system operation using the corresponding data windows BBFID, BEFID, PRFID, AFFID and MFID of five fields. When the control signal NPC has a logic low level, the 3D BPF 330 may perform PAL system operation using the corresponding data windows BEFID, PRFID and AAFID of three fields.

In the NTSC system, the first filter 331, the second filter 332, the third filter 333, the fourth filter 334, the fifth filter 335 and the combiner 336 may all be operated. The first filter 331 performs convolution of the corresponding data window of the first field data BBFID of the input video signal and the first filer mask $h_1(i, j, t)$ determined by Equation 6. As described above with reference to FIG. 13, the data window of the first field data BBFID exists in field data that is two fields before the third field data PRFID currently processed.

The second filter 332 performs convolution of the corresponding data window of the second field data BEFID of the input video signal and the second filer mask $h_2(i, j, t)$ determined by Equation 6. The data window of the second field data BEFID exists in field data that is one field before the third field data PRFID currently processed.

The third filter 333 performs convolution of the corresponding data window of the third field data PRFID of the input video signal and the third filer mask $h_3(i, j, t)$ determined by Equation 6. The data window of the third field data PRFID exists in the currently processed field data.

The fourth filter 334 performs convolution of the corresponding data window of the fourth field data AFFID of the input video signal and the fourth filer mask $h_4(i, j, t)$ determined by Equation 6. The data window of the fourth field data AFFID exists in field data that is one field after the third field data PRFID currently processed.

The fifth filter 335 performs convolution of the corresponding data window of the fifth field data AAFID of the input video signal and the fifth filer mask $h_5(i, j, t)$ determined by Equation 6. The data window of the fourth field data AAFID exists in field data that is two fields after the third field data PRFID currently processed.

In the PAL system, the second filter 332, the third filter 333, the fourth filter 334 and the combiner 336 may be operated. Here, the second filter 332 performs convolution of the filter mask $h_1(i, j, t)$ determined by Equation 9 and the corresponding data window of the field data BEFID of the input video signal. That is, the second filter 332 uses data items in vertical and horizontal directions, which have the opposite C component phase to the central pixel, and data items in diagonal directions, which have the same C component phase as the central pixel, among digital data of three continuous horizontal scan lines of the field data BEFID that is one field before the current field, as represented by Equation 9.

The third filter 333 performs convolution of the filter mask $h_2(i, j, t)$ determined by Equation 9 and the corresponding data window of the field data PRFID of the input video signal. Here, the third filter 333 uses data items in vertical and horizontal directions, which have the opposite C component phase to the central pixel, and data items in diagonal directions, which have the same C component phase as the central pixel, among digital data of three continuous horizontal scan lines of the current field data PRFID, as represented by Equation 9.

The fourth filter 334 performs convolution of the filter mask $h_3(i, j, t)$ determined by Equation 9 and the corresponding data window of the field data AFFID of the input video signal. Here, the fourth filter 334 uses data items in vertical and horizontal directions, which have the opposite C component phase to the central pixel, and data items in diagonal directions, which have the same C component phase as the central pixel, among digital data of three continuous horizontal scan lines of the field data AFFID that is one field after the current field, as represented by Equation 9.

In the NTSC system, the combiner 336 appropriately combines the convolution results of the first to fifth filters 331 to 335, i.e., performs addition or subtraction on the convolution results, to output the result as the C signal. In the PAL system, the combiner 336 appropriately combines the convolution results of the second, third and fourth filter 332, 333 and 334, i.e., performs addition or subtraction on the convolution results, to output the result as the C signal.

Through the aforementioned operation, the 3D BPF 330 continuously and adaptively performs comb filtering, 1D band pass filtering and 2D/3D band pass filtering in response to spatio-temporal local characteristics of the input video signal.

Figure 20:
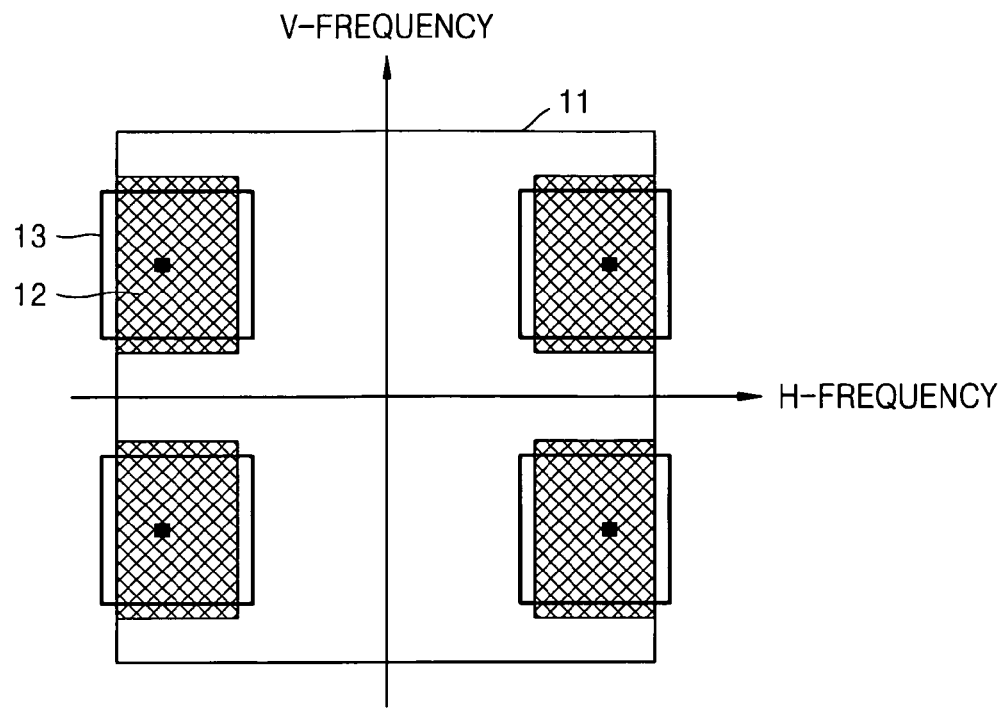
FIG. 20 illustrates spectrum characteristics representing Y and C components with respect to horizontal and vertical frequencies of a video signal.
Figure 21:
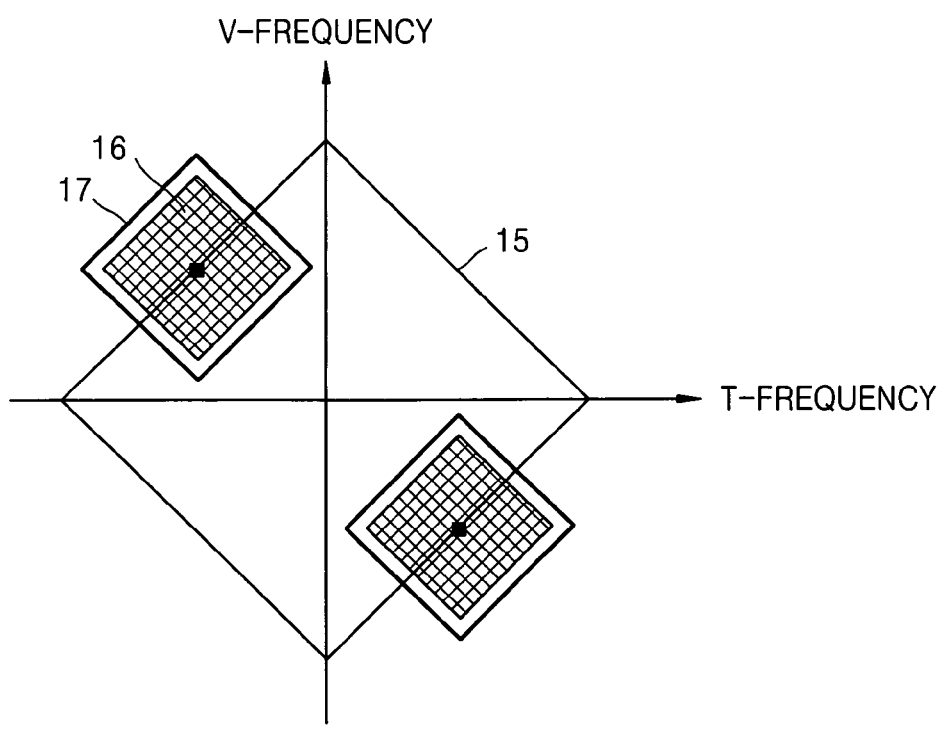
FIG. 21 illustrates spectrum characteristics representing Y and C components with respect to temporal and vertical frequencies of a video signal.

For example, when correlation is high or low in all directions of the spatio-temporal domain, all the 2D weight coefficients Wu, Wd, Wl and Wr and the 3D weight coefficients Wb1, Wb2, Wf1 and Wf2/Wb and Wf of Equations 5 and 8 affect the filtering operation of the 3D BPF 330. Accordingly, in spectrum characteristics with respect to horizontal and vertical frequencies H and V, shown in FIG. 20, the high frequency component 12 of the C signal, included in the Y component 11, is extracted distinctly like a desired sharp form 13, to thereby remove artifacts. Specifically, an averaging effect among surrounding pixels stabilizes the signal in response to the weight coefficients of Equations 5 and 8 when correlation is high in all directions. When correlation is low in all directions, the C component is separated in the sharpest form, and thus cross-color artifacts are minimized and the high frequency component of the Y signal is extracted in a distinct manner. Similarly, in spectrum characteristics with respect to time and vertical frequencies T and V, shown in FIG. 21, the high frequency component 16 of the C signal, included in the Y component 15, is extracted distinctly like a desired sharp form 17, to thereby remove artifacts.

On the other hand, if correlation is spatio-temporally high in a specific direction, plane coefficients in the corresponding direction become large but plane coefficients in the other directions become small. Thus, comb filtering or 1D band pass filtering is carried out on pixels surrounding the central pixel to separate Y and C signals, thereby minimizing artifacts.

Figure 22:
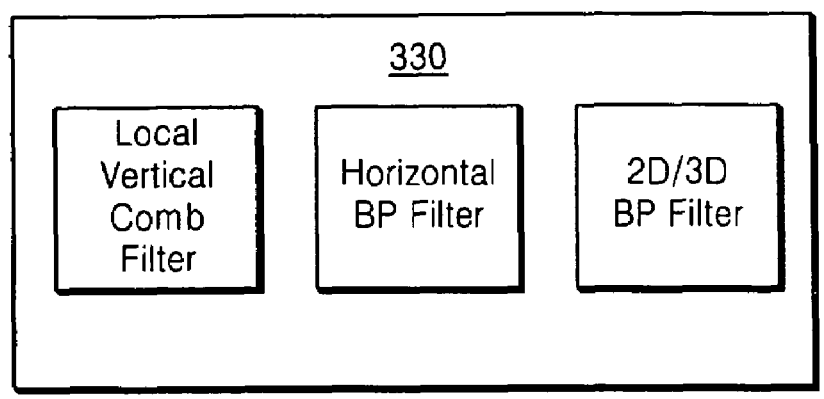
FIG. 22 illustrates a block diagram of the 3D BPF of FIG. 3.

While the weight coefficients will determine the filtering performed, the 3D BPF 330 may serve as any of the three types of filters, e.g., a local vertical comb filter, horizontal band pass filter, and/or a 2D/3D band pass filter, as illustrated schematically in FIG. 22.

As described above, in the video signal processing apparatus 300 according to the present invention, the adaptive 3D BPF 330 performs Y/C separation according to local comb filtering/1D band pass filtering when the edge direction is fixed vertically/horizontally based on fields in response to spatio-temporal local characteristics of an image using spatio-temporal filters. When the edge direction is not fixed horizontally/vertically, the 3D BPF 330 performs 2D/3D band pass filtering in all directions. The 3D BPF continuously performs comb filtering, 1D band pass filtering and 2D band pass filtering in response to the spatio-temporal local characteristics of the image.

The video signal processing apparatus according to the present invention continuously and adaptively performs local comb filtering/1D band pass filtering or 2D band pass filtering in all directions in response to spatio-temporal local characteristics of an image in the NTSC/PAL system. Thus, the video signal processing apparatus of the present invention may detect the edge of the image accurately more than a conventional apparatus that discretely selects filtering methods, and produce better and more stable spectrum characteristics than a frame-based Y/C separation filter. Accordingly, artifacts such as cross-luma and cross-color may be reduced or removed when the video signal processing apparatus of the present invention is applied to a display system, resulting in improved image quality.

Exemplary embodiments of the present invention have been disclosed herein, and although specific terms are employed, they are used and are to be interpreted in a generic and descriptive sense only and not for purpose of limitation. For example, while embodiments of the present invention has been described relative to a hardware implementation, the processing of the present invention may be implemented in software, e.g., by an article of manufacture having a machine-accessible medium including data that, when accessed by a machine, cause the machine to separate the Y and C components. Accordingly, it will be understood by those of ordinary skill in the art that various changes in form and details may be made without departing from the spirit and scope of the present invention as set forth in the following claims.

What is claimed is:

1. A video signal processing method, comprising:
   generating 2D weight coefficients and 3D weight coefficients using data of a plurality of fields of an input video signal; and
   generating a C signal of the input video signal by carrying out convolution of a horizontal coefficient mask, a vertical coefficient mask and a time coefficient mask, which are composed based on the weight coefficients, and corresponding data windows of the plurality of field data, wherein generating the C signal includes local vertical comb filtering, horizontal band pass filtering and 2D band pass filtering according to spatio-temporal local characteristics of the input video signal.

2. The method as claimed in claim 1, wherein local vertical comb filtering is performed when local characteristics indicate high vertical correlation, local horizontal band pass filtering is performed when local characteristics indicate high horizontal correlation, and 2D or 3D band pass filtering is carried out when local characteristics indicate high or low correlation in multiple directions using at least three field data having an interval of one field.

3. The method as claimed in claim 1, wherein the 2D weight coefficients include a first coefficient proportional to vertical and upward correlations with the current pixel, a second coefficient proportional to vertical and downward correlations with the current pixel, a third coefficient proportional to horizontal and leftward correlations with the current pixel, and a fourth coefficient proportional to horizontal and rightward correlations with the current pixel.

4. The method as claimed in claim 1, further comprising:
   subtracting the generated C signal from the input video signal; and
   outputting the subtraction result as a Y signal.

5. The method as claimed in claim 1, wherein generating the C signal comprises:
   performing convolution of a corresponding data window of a first field data of the input video signal and a first filter mask;
   performing convolution of a corresponding data window of a second field data of the input video signal and a second filter mask;
   performing convolution of a corresponding data window of a third field data of the input video signal and a third filter mask; and
   combining the convolution results to output the combined result as the C signal,
   wherein the first, second and third filter masks are generated from 3D convolution of the horizontal coefficient mask, the vertical coefficient mask and the time coefficient mask.

6. The method as claimed in claim 5, wherein the video signal method is applied to a PAL system.

7. The method as claimed in claim 5, wherein the first field data, the second field data and the third field data have an interval of one field.

8. The method as claimed in claim 5, wherein the horizontal coefficient mask, the vertical coefficient mask and the time coefficient mask each are one-dimensional.

9. The method as claimed in claim 5, wherein the 3D weight coefficients include a first coefficient in proportion to a correlation between the currently processed pixel data and data of the field before the current field, and a second coefficient in proportion to a correlation between the currently processed pixel data and data of the field after the current field.

10. The method as claimed in claim 5, wherein generating the C signal further comprises:
    performing convolution of a corresponding data window of a fourth field data of the input video signal and a fourth filter mask;
    performing convolution of a corresponding data window of a fifth field data of the input video signal and a fifth filter mask;
    combining the five convolution results to be output the combined result as the generated C signal,
    wherein the time coefficient mask includes first and second coefficient masks, and the first to fifth filter masks are generated from 3D convolution of the horizontal coefficient mask, the vertical coefficient mask, the first coefficient mask and the second coefficient mask.

11. The method as claimed in claim 10, wherein the video signal processing method is applied to an NTSC system.

12. The method as claimed in claim 10, wherein:
    the 3D weight coefficients used for the first coefficient mask include;
    a first coefficient in proportion to the correlation in a first direction between the currently processed pixel data and data of the field before the current field, and
    a second coefficient in proportion to the correlation in the second direction between the currently processed pixel data and data of the field after the current field; and
    the 3D weight coefficients used for the second coefficient mask include;
    a third coefficient in proportion to the correlation in a third direction between the currently processed pixel data and data of the field before the current field, and
    a fourth coefficient in proportion to the correlation in a fourth direction between the currently processed pixel data and data of the field after the current field.

13. A video signal processing apparatus, comprising:
    a weight determination unit to generate 2D weight coefficients and 3D weight coefficients using data of a plurality of fields of an input video signal; and
    a filter to convolute a horizontal coefficient mask, a vertical coefficient mask and a time coefficient mask, the masks respectively composed of the weight coefficients, with corresponding data windows of the data of the plurality of fields to generate a C signal of the input video signal,
    wherein the filter adaptively performs local vertical comb filtering, horizontal band pass filtering and 2D band pass filtering in response to spatio-temporal local characteristics of the input video signal.

14. The apparatus as claimed in claim 13, wherein the filter performs:
    local vertical comb filtering when the local characteristics of the input video signal indicate high vertical correlation;
    local horizontal band pass filtering when the local characteristics of the input video signal indicate high horizontal correlation; and
    2D or 3D band pass filtering when the local characteristics of the input video signal indicate high or low correlation in multiple directions using at least three field data items having an interval of one field.

15. The apparatus as claimed in claim 13, wherein the 2D weight coefficients include:
    a first coefficient proportional to vertical and upward correlations with a current pixel;
    a second coefficient proportional to vertical and downward correlations with the current pixel;
    a third coefficient proportional to horizontal and leftward correlations with the current pixel; and
    a fourth coefficient proportional to horizontal and rightward correlations with the current pixel.

16. The apparatus as claimed in claim 13, further comprising a subtracter to subtract the C signal output from the filter from the input video signal to obtain the subtraction result as a Y signal.

17. The apparatus as claimed in claim 13, wherein the filter comprises:
    a first filter to convolute a first data window of a first field data of the input video signal and a first filter mask;
    a second filter to convolute a second data window of a second field data of the input video signal and a second filter mask;
    a third filter to convolute a third data window of a third field data of the input video signal and a third filter mask; and
    a combiner to combine the convolution results to first, second and thrid filters to generate the C signal,
    wherein the first, second and third filter masks are generated from 3D convoluting the horizontal coefficient mask, the vertical coefficient mask and the time coefficient mask.

18. The apparatus as claimed in claim 17, wherein the video signal apparatus is applied to a PAL system.

19. The apparatus as claimed in claim 17, wherein the first field data, the second field data and the third field data have an interval of one field.

20. The apparatus as claimed in claim 17, wherein the horizontal coefficient mask, the vertical coefficient mask and the time coefficient mask each are one-dimensional.

21. The apparatus as claimed in claim 17, wherein the 3D weight coefficients include:
    a first coefficient proportional to a correlation between a current pixel data and data of a field before a current field; and a second coefficient proportional to a correlation between the current pixel data and data of a field after the current field.

22. The apparatus as claimed in claim 17, wherein the filter further comprises:
a fourth filter to convolute of a fourth data window of a fourth field data of the input video signal and a fourth filter mask; and
a fifth filter to convolute a fifth data window of a fifth field data of the input video signal and a fifth filter mask,
wherein the combiner combines the convolution results of the first to fifth filters to generate the C signal, the time coefficient mask includes first and second coefficient masks, and the first to fifth filter masks are generated from 3D convolution of the horizontal coefficient mask, the vertical coefficient mask, the first coefficient mask and the second coefficient mask.

23. The apparatus as claimed in claim 22, wherein the video signal processing apparatus is applied to an NTSC system.

24. The apparatus as claimed in claim 22, wherein:
the 3D weight coefficients used for the first coefficient mask include
a first coefficient proportional to a correlation in a first direction between the current pixel data and data of the field before the current field, and
a second coefficient proportional to a correlation in the second direction between the currently processed pixel data and data of the field after the current field; and
the 3D weight coefficients used for the second coefficient mask include
a third coefficient proportional to a correlation in a third direction between the currently processed pixel data and data of the field before the current field, and
a fourth coefficient proportional to the correlation in a fourth direction between the current pixel data and data of the field after the current field.

* * * * *